(12) United States Patent
Miao

(10) Patent No.: US 11,496,915 B2
(45) Date of Patent: Nov. 8, 2022

(54) RADIO LINK MONITORING (RLM) FOR UNICAST SIDELINK (SL) COMMUNICATIONS

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/926,588

(22) Filed: Jul. 10, 2020

(65) Prior Publication Data

US 2021/0014711 A1  Jan. 14, 2021

Related U.S. Application Data

(60) Provisional application No. 62/872,634, filed on Jul. 10, 2019.

(51) Int. Cl.
| | |
|---|---|
| *H04W 24/08* | (2009.01) |
| *H04W 4/40* | (2018.01) |
| *H04W 76/27* | (2018.01) |
| *H04B 7/06* | (2006.01) |
| *H04L 5/00* | (2006.01) |

(Continued)

(52) U.S. Cl.
CPC .......... *H04W 24/08* (2013.01); *H04B 7/0626* (2013.01); *H04L 5/0051* (2013.01); *H04L 5/10* (2013.01); *H04W 4/40* (2018.02); *H04W 76/27* (2018.02); *H04W 92/18* (2013.01)

(58) Field of Classification Search
CPC ......... H04W 24/08; H04W 4/40; H04W 4/44; H04W 4/46; H04W 4/70; H04W 56/001; H04W 76/14; H04W 76/27; H04W 92/16; H04L 5/0051; H04L 5/10; H04B 7/0626
See application file for complete search history.

(56) References Cited

U.S. PATENT DOCUMENTS

| | | | |
|---|---|---|---|
| 9,277,523 B2* | 3/2016 | Sampath | H04W 4/025 |
| 9,572,063 B2* | 2/2017 | Etemad | H04L 41/0823 |
| 11,102,839 B2* | 8/2021 | Wu | H04W 80/08 |

(Continued)

OTHER PUBLICATIONS

[No Athor Listed], 3GPP TS 38.331, V15.6.0, "3rd Generation Partnership Project; Technical Specification Group Radio Access Network; NR; Radio Resource Control (RRC) protocol specification (Release 15)," F-06921, Jun. 29, 2019, pp. 1-520.

(Continued)

*Primary Examiner* — Jean A Gelin
(74) *Attorney, Agent, or Firm* — Fish & Richardson P.C.

(57) ABSTRACT

Apparatuses, systems, and methods are disclosed for radio link monitoring (RLM) for unicast sidelink (SL) communications. A processor for a base station includes first circuitry configured to generate a radio resource control (RRC) message comprising an RRC information element indicating a number of unicast SL RLM reference signals. The processor includes second circuitry configured to encode the RRC message for transmission to a user equipment (UE). The processor includes third circuitry configured to generate a reference signal indicating an in-sync (IS) threshold and an out-of-sync (OOS) threshold for an RLM resource. The processor includes fourth circuitry configured to encode the reference signal for transmission to the UE. The processor includes fifth circuitry configured to transmit the RRC message and the reference signal to the UE.

18 Claims, 13 Drawing Sheets

(51) Int. Cl.
*H04L 5/10* (2006.01)
*H04W 92/18* (2009.01)

(56) References Cited

U.S. PATENT DOCUMENTS

| | | | | |
|---|---|---|---|---|
| 2013/0107832 | A1* | 5/2013 | Kim | H04L 5/0035 |
| | | | | 370/329 |
| 2019/0081691 | A1* | 3/2019 | Nagaraja | H04W 36/305 |
| 2019/0141557 | A1* | 5/2019 | da Silva | H04W 76/18 |
| 2020/0021372 | A1* | 1/2020 | Zhang | H04B 7/0695 |
| 2020/0067583 | A1* | 2/2020 | Shin | H04B 7/0643 |
| 2020/0107236 | A1* | 4/2020 | Tseng | H04W 4/50 |
| 2020/0119893 | A1* | 4/2020 | Zhang | H04L 5/0057 |
| 2020/0205209 | A1* | 6/2020 | Pan | H04W 72/085 |
| 2020/0245394 | A1* | 7/2020 | Wu | H04W 4/40 |
| 2020/0252989 | A1* | 8/2020 | Chen | H04W 80/08 |
| 2020/0252990 | A1* | 8/2020 | Ganesan | H04B 7/0632 |
| 2020/0322095 | A1* | 10/2020 | Park | H04L 5/0094 |
| 2020/0336973 | A1* | 10/2020 | Niu | H04L 5/0053 |
| 2020/0337103 | A1* | 10/2020 | Harada | H04W 24/08 |
| 2020/0351975 | A1* | 11/2020 | Tseng | H04L 5/001 |
| 2020/0413467 | A1* | 12/2020 | Pan | H04W 72/04 |
| 2021/0028984 | A1* | 1/2021 | Dasilva | H04W 24/08 |
| 2021/0099263 | A1* | 4/2021 | Cheng | H04W 76/19 |
| 2021/0112431 | A1* | 4/2021 | Kazmi | H04L 1/203 |
| 2021/0219269 | A1* | 7/2021 | Lee | H04W 28/0289 |
| 2021/0235340 | A1* | 7/2021 | Moosavi | H04W 74/0808 |
| 2022/0191847 | A1* | 6/2022 | Hong | H04L 1/18 |

OTHER PUBLICATIONS

3GPP TS 38.331, "3rd Generation Partnership Project; Technical Specification Group Radio Access Network; Nr; Radio Resource Control (RRC); Protocol Specification (Release 15)," Mar. 2017, 13 pages.

Ericsson, "On SL RLM/RLF in NR V2X for unicast," 3GPP TSG-RAN WG1 Meeting #97, R1-1907146, Reno, US, May 12-17, 2019, 3 pages.

Huawei et al., "On RLM and RLF in NR V2X," 3GPP TSG RAN WG1 Meeting #97, R1-1907494, Reno, USA, May 13-17, 2019, 3 pages.

PCT International Search Report and Written Opinion in International Appln. No. PCT/US2020/041713, dated Oct. 23, 2020, 17 pages.

PCT International Preliminary Report on Patentability in International Appln. No. PCT/US2020/041713, dated Jan. 20, 2022, 11 pages.

* cited by examiner

Generate, by a processor for a base station, a radio resource control (RRC) message comprising an RRC information element indicating a number of unicast sidelink (SL) radio link monitoring (RLM) reference signals
1304

Encode, by the processor, the RRC message for transmission to a user equipment (UE)
1308

Generate, by the processor, a reference signal indicating an in-sync (IS) threshold and an out-of-sync (OOS) threshold for an RLM resource
1312

Encode, by the processor, the reference signal for transmission to the UE
1316

Transmit, by the processor, the RRC message and the reference signal to the UE
1320

RADIO LINK MONITORING (RLM) FOR UNICAST SIDELINK (SL) COMMUNICATIONS

CROSS-REFERENCE TO RELATED APPLICATION

This application claims priority from U.S. Provisional Application No. 62/872,634 filed on Jul. 10, 2019, which is incorporated by reference in its entirety herein.

TECHNICAL FIELD

This description relates generally to wireless devices, and more particularly to apparatus, systems, and methods for radio link monitoring (RLM) for unicast sidelink (SL) communications.

BACKGROUND

Wireless communication systems are rapidly growing in use. Further, wireless communication technology has evolved from voice-only communications to also include the transmission of data, such as Internet and multimedia content. However, the radio link failure (RLF) procedure in the air interface physical layer (Uu interface) can pose challenges when link conditions between a user equipment (UE) and a serving cell deteriorate. The access stratum can indicate the deteriorating link conditions to the upper layer (e.g., "out-of-sync" (OOS)), and an RLF is declared if the link conditions stay poor for a certain time period. Moreover, RLF can also be triggered by random access problems or when a maximum number of radio link control (RLC) retransmissions are reached.

SUMMARY

The implementations disclosed provide apparatus, systems, and methods for radio link monitoring (RLM) for unicast sidelink (SL) communications. A processor for a base station includes first circuitry configured to generate a radio resource control (RRC) message comprising an RRC information element indicating a number of unicast SL RLM reference signals. The processor includes second circuitry configured to encode the RRC message for transmission to a user equipment (UE). The processor includes third circuitry configured to generate a reference signal indicating an in-sync (IS) threshold and an out-of-sync (OOS) threshold for an RLM resource. The processor includes fourth circuitry configured to encode the reference signal for transmission to the UE. The processor includes fifth circuitry configured to transmit the RRC message and the reference signal to the UE.

In some implementations, the RRC information element further indicates a type of the RLM resource.

In some implementations, the RRC information element further indicates a timer and a constant for at least one of a radio link failure (RLF) detection procedure or a unicast SL connection procedure.

In some implementations, the RRC information element further indicates an IS/OOS threshold configuration based on the IS threshold and the OOS threshold for the RLM resource.

In some implementations, the reference signal is a channel state information-reference signal (CSI-RS) or a demodulation reference signal (DMRS).

In some implementations, the reference signal further indicates a number of consecutive reception events for an IS determination.

In some implementations, the reference signal further indicates a number of consecutive erroneous reception events required for an OOS determination.

The implementations disclosed herein enable RLM/RLF functions for unicast SL communications. Among others, the advantages and benefits of the implementations disclosed include support for both TX-side and RX-side RLM using generic RLM detection resources. RLF detection criteria can be semi-statically configured using RRC signaling. The unicast SL RB link connection can be released, resumed, or recovered using timer operations. As a result, RLM/RLF and associated unicast SL management is supported in a resource efficient manner. The implementations further enable SL radio resource management (RRM)-based AS-level link management and RLM reference signal (RS) design in accordance with 3GPP RAN 1. In accordance with 3GPP RAN2, the air interface physical layer (Uu) RLM model is supported for SL RLM.

BRIEF DESCRIPTION OF THE DRAWINGS

FIG. 13 is a flowchart illustrating a process for RLM monitoring for unicast SL communications.

DETAILED DESCRIPTION

In the air interface physical layer (Uu interface), the radio link failure (RLF) procedure can pose challenges when link conditions between a user equipment (UE) and a serving cell deteriorate. The access stratum can indicate the deteriorating link conditions to the upper layer (e.g., "out-of-sync" (OOS)), and an RLF is declared if the link conditions stay poor for a certain time period. Moreover, RLF can also be triggered by random access problems or when a maximum number of radio link control (RLC) retransmissions are reached.

The implementations disclosed provide apparatus, systems, and methods for radio link monitoring (RLM) for unicast sidelink (SL) communications. The implementations enable a UE to recover a link via radio resource control (RRC) re-establishment after an RLF is declared. For SL unicast link management, continuous evaluation by the UE of an already established link with another peer UE is enabled; moreover, the UE is enabled to react once the link conditions deteriorate. The implementations support the 3GPP RAN2 agreement that both radio resource management (RRM) and RLM-based solutions can be used for access stratum (AS)-level link management for NR SL unicast.

In some implementations, a processor for a base station includes first circuitry configured to generate a radio resource control (RRC) message comprising an RRC information element indicating a number of unicast SL RLM reference signals. The processor includes second circuitry configured to encode the RRC message for transmission to a user equipment (UE). The processor includes third circuitry configured to generate a reference signal indicating an in-sync (IS) threshold and an out-of-sync (OOS) threshold for an RLM resource. The processor includes fourth circuitry configured to encode the reference signal for transmission to the UE. The processor includes fifth circuitry configured to transmit the RRC message and the reference signal to the UE.

Figure 1:
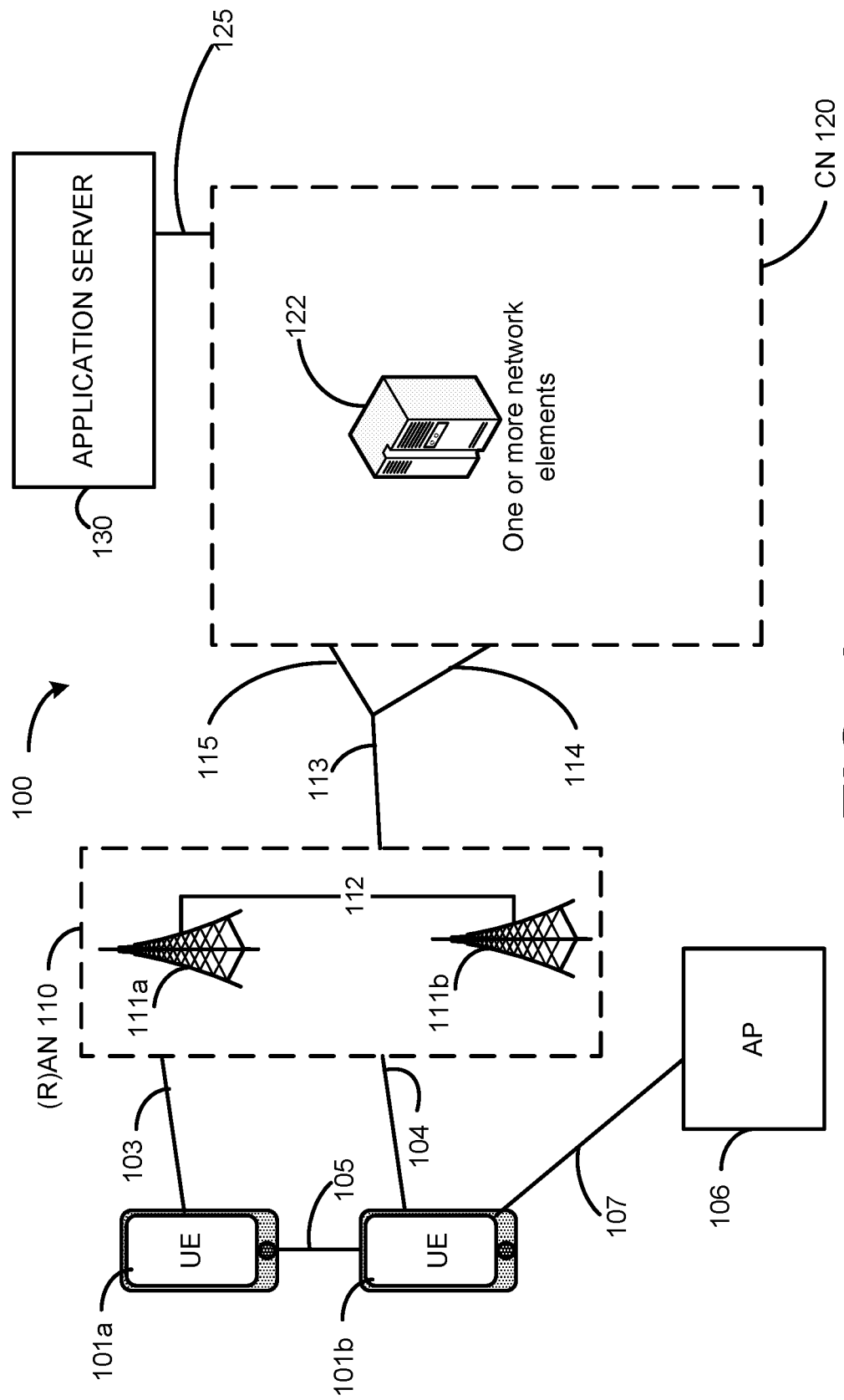
FIG. 1 illustrates an example of a wireless communication system, in accordance with one or more implementations.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 can also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but can also include any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some implementations, any of the UEs 101 can be IoT UEs, which can include a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with RAN 110. In implementations, the RAN 110 can be an NG RAN or a 5G RAN, an E-UTRAN, or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 103 and 104, respectively, each of which includes a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UEs 101 can directly exchange communication data via a ProSe interface 105. The ProSe interface 105 can alternatively be referred to as a SL interface 105 and can include one or more logical channels, including but not limited to a PSCCH, a PSSCH, a PSDCH, and a PSBCH.

The UE 101*b* is shown to be configured to access an AP 106 (also referred to as "WLAN node 106," "WLAN 106," "WLAN Termination 106," "WT 106" or the like) via connection 107. The connection 107 can include a local wireless connection, such as a connection consistent with any IEEE 802.11 protocol, wherein the AP 106 would include a wireless fidelity (Wi-Fi®) router. In this example, the AP 106 is shown to be connected to the Internet without connecting to the core network of the wireless system (described in further detail below). In various implementations, the UE 101*b*, RAN 110, and AP 106 can be configured to utilize LWA operation and/or LWIP operation. The LWA operation can involve the UE 101*b* in RRC_CONNECTED being configured by a RAN node 111*a-b* to utilize radio resources of LTE and WLAN. LWIP operation can involve the UE 101*b* using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more AN nodes or RAN nodes 111*a* and 111*b* (collectively referred to as "RAN nodes 111" or "RAN node 111") that enable the connections 103 and 104. As used herein, the terms "access node," "access point," or the like can describe equipment that provides the radio baseband functions for data and/or voice connectivity between a network and one or more users. These access nodes can be referred to as base station (BS), gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various implementations, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 111 can be implemented as one or more software entities running on server computers as part of a virtual network, which can be referred to as a CRAN and/or a virtual baseband unit pool (vBBUP). In these implementations, the CRAN or vBBUP can implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-DUs that are connected to a gNB-CU via individual F1 interfaces (not shown by FIG. 1). In these implementations, the gNB-DUs can include one or more remote radio heads or RFEMs (see, e.g., FIG. 4), and the gNB-CU can be operated by a server that is located in the RAN 110 (not shown) or by a server pool in a similar manner as the CRAN/vBBUP. Additionally or alternatively, one or more of the RAN nodes 111 can be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra).

In V2X scenarios one or more of the RAN nodes 111 can be or act as RSUs. The term "Road Side Unit" or "RSU" can refer to any transportation infrastructure entity used for V2X communications. An RSU can be implemented in or by a suitable RAN node or a stationary (or relatively stationary) UE, where an RSU implemented in or by a UE can be referred to as a "UE-type RSU," an RSU implemented in or by an eNB can be referred to as an "eNB-type RSU," an RSU implemented in or by a gNB can be referred to as a "gNB-type RSU," and the like. In one example, an RSU is a computing device coupled with radio frequency circuitry located on a roadside that provides connectivity support to passing vehicle UEs 101 (vUEs 101). The RSU can also include internal data storage circuitry to store intersection map geometry, traffic statistics, media, as well as applications/software to detect and control ongoing vehicular and pedestrian traffic. The RSU can operate on the 5.9 GHz Direct Short Range Communications (DSRC) band to provide very low latency communications required for high speed events, such as crash avoidance, traffic warnings, and the like. Additionally or alternatively, the RSU can operate on the cellular V2X band to provide the aforementioned low latency communications, as well as other cellular communications services. Additionally or alternatively, the RSU can operate as a Wi-Fi hotspot (2.4 GHz band) and/or provide connectivity to one or more cellular networks to provide uplink and downlink communications. The computing device(s) and some or all of the radiofrequency circuitry of the RSU can be packaged in a weatherproof enclosure suitable for outdoor installation, and can include a network interface controller to provide a wired connection (e.g., Ethernet) to a traffic signal controller and/or a backhaul network.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In implementations, the UEs 101 can be configured to communicate using OFDM communication signals with each other or with any of the RAN nodes 111 over a multicarrier communication channel. The UEs 101 can communicate in accordance with various communication techniques, such as, but not limited to, an OFDMA communication technique (e.g., for downlink communications) or a SC-FDMA communication technique (e.g., for uplink and ProSe or sidelink communications). However, the scope of the implementations is not limited in this respect. The OFDM signals can include multiple orthogonal subcarriers.

In some implementations, a downlink resource grid can use downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. A smaller time-frequency unit in a resource grid is a resource element. Each resource grid includes a number of resource blocks, which describe the mapping of certain physical channels to resource elements. Each resource block includes a collection of resource elements; in the frequency domain, this can represent a smaller quantity of resources that currently can be allocated. There are several different physical downlink channels that are conveyed using such resource blocks.

According to various implementations, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 3.8 GHz, whereas the unlicensed spectrum can include the 5 GHz band. NR in the unlicensed spectrum can be referred to as NR-U, and LTE in an unlicensed spectrum can be referred to as LTE-U, licensed assisted access (LAA), or MulteFire.

To operate in the unlicensed spectrum, the UEs 101 and the RAN nodes 111 can operate using LAA, eLAA, and/or feLAA mechanisms. In these implementations, the UEs 101 and the RAN nodes 111 can perform one or more known medium-detecting operations and/or carrier-detecting operations in order to determine whether one or more channels in the unlicensed spectrum is unavailable or otherwise occupied prior to transmitting in the unlicensed spectrum. The medium/carrier detecting operations can be performed according to a listen-before-talk (LBT) protocol.

LBT is a mechanism whereby equipment (for example, UEs 101 RAN nodes 111, etc.) detects a medium (for example, a channel or carrier frequency) and transmits when the medium is idle (or when a specific channel in the medium is unoccupied). The medium detecting operation can include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED can include detecting RF energy across an intended transmission band for a period of time and comparing the RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node detects the channel as idle and transmits at the same time. The backoff mechanism can be a counter that is drawn randomly within the CWS, which is increased exponentially upon the occurrence of collision and reset to a smaller value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, can have an LAA contention window that is variable in length between X and Y ECCA slots, where X and Y are smaller and larger values for the CWSs for LAA. In one example, a smaller CWS for an LAA transmission can be 9 microseconds (s); however, the size of the CWS and a MCOT (for example, a transmission burst) can be based on governmental regulatory requirements.

The LAA mechanisms are built upon CA technologies of LTE-Advanced systems. In CA, each aggregated carrier is referred to as a CC. A CC can have a bandwidth of 1.4, 3, 5, 10, 15 or 20 MHz and five CCs can be aggregated, and therefore, an aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also includes individual serving cells to provide individual CCs. The coverage of the serving cells can differ, for example, because CCs on different frequency bands will experience different pathloss. A primary service cell or PCell can provide a PCC for both UL and DL, and can handle RRC and NAS related activities. The other serving cells are referred to as SCells, and each SCell can provide an individual SCC for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It can also inform the UEs 101 about the transport format, resource allocation, and HARQ information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses CCEs to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations can use concepts for resource allocation for control channel information that are an extension of the above-described concepts. For example, some implementations can utilize an EPDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 111 can be configured to communicate with one another via interface 112. In implementations where the system 100 is an LTE system (e.g., when CN 120 is an EPC 220 as in FIG. 2), the interface 112 can be an X2 interface 112. The X2 interface can be defined between two or more RAN nodes 111 (e.g., two or more eNBs and the like) that connect to EPC 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current smaller desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In implementations where the system 100 is a 5G or NR system (e.g., when CN 120 is an 5GC 320 as in FIG. 3), the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GTP-U layer on top of a UDP and/or IP layer(s) to carry user plane PDUs. The Xn-C protocol stack can include an application layer signaling protocol (referred to as Xn Application Protocol (Xn-AP)) and a transport network layer that is built on SCTP. The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this implementation, core network (CN) 120. The CN 120 can include multiple network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some implementations, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. NFV architectures and infrastructures can be used to virtualize one or more network functions, alternatively performed by proprietary hardware, onto physical resources including a combination of industry-standard server hardware, storage hardware, or switches. In other words, NFV systems can execute virtual or reconfigurable implementations of one or more EPC components/functions.

Generally, the application server 130 can be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In implementations, the CN 120 can be a 5GC (referred to as "5GC 120" or the like), and the RAN 110 can be connected with the CN 120 via an NG interface 113. In implementations, the NG interface 113 can be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Implementations where the CN 120 is a 5GC 120 are discussed in more detail with regard to FIG. 3.

In implementations, the CN 120 can be a 5G CN (referred to as "5GC 120" or the like), while in other implementations, the CN 120 can be an EPC). Where CN 120 is an EPC (referred to as "EPC 120" or the like), the RAN 110 can be connected with the CN 120 via an S1 interface 113. In implementations, the S1 interface 113 can be split into two parts, an S1 user plane (S1-U) interface 114, which carries traffic data between the RAN nodes 111 and the S-GW, and the S1-MME interface 115, which is a signaling interface between the RAN nodes 111 and MMES.

Figure 2:
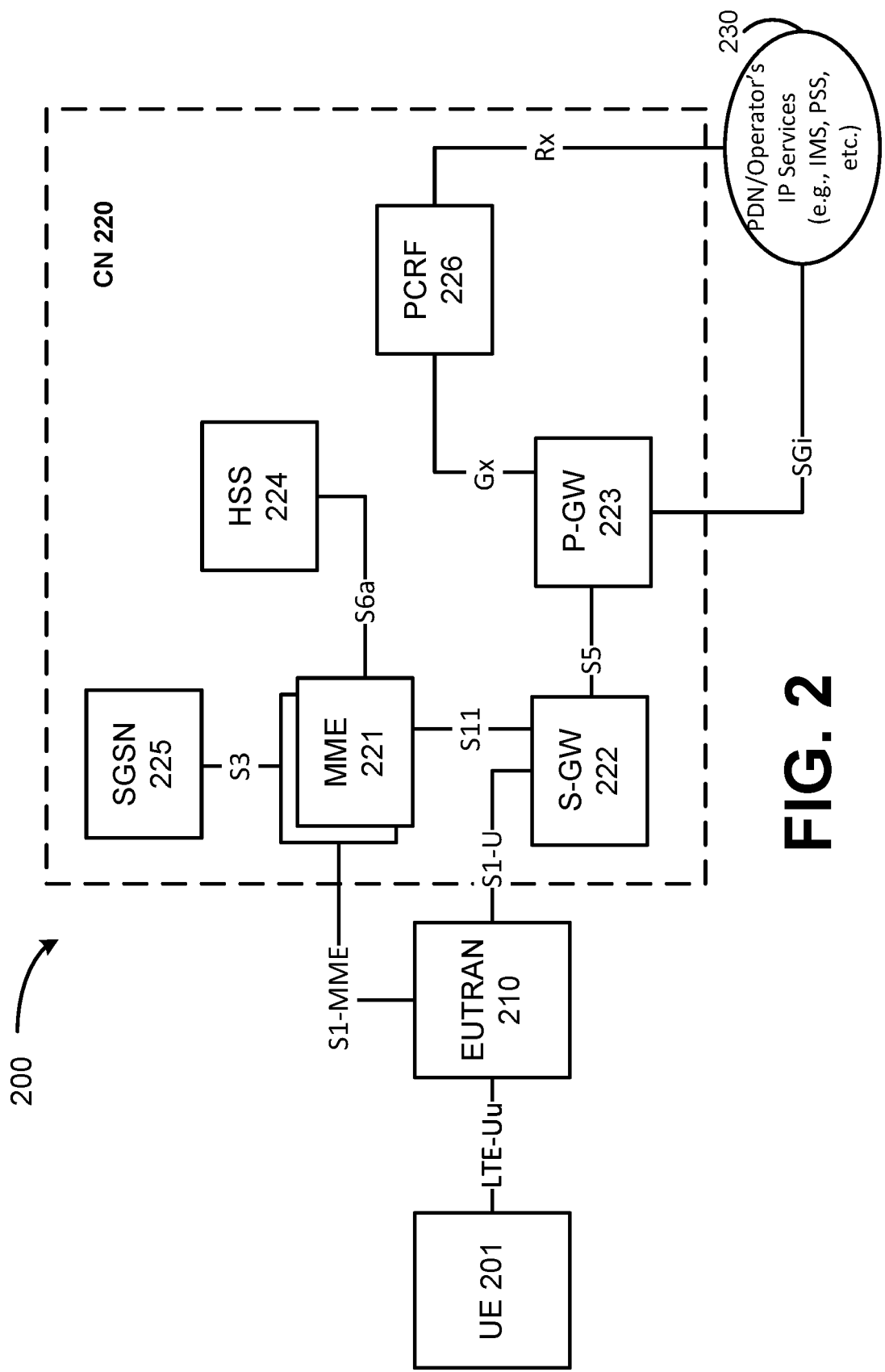
FIG. 2 illustrates an example architecture of a system including a first core network (CN), in accordance with one or more implementations.

FIG. 2 illustrates an example architecture of a system 200 including a first CN 220, in accordance with one or more implementations. In this example, system 200 can implement the LTE standard wherein the CN 220 is an EPC 220 that corresponds with CN 120 of FIG. 1. Additionally, the UE 201 can be the same or similar as the UEs 101 of FIG. 1, and the E-UTRAN 210 can be a RAN that is the same or similar to the RAN 110 of FIG. 1, and which can include RAN nodes 111 discussed previously. The CN 220 can include MMEs 221, an S-GW 222, a P-GW 223, a HSS 224, and a SGSN 225.

The MMEs 221 can be similar in function to the control plane of legacy SGSN, and can implement MM functions to keep track of the current location of a UE 201. The MMEs 221 can perform various MM procedures to manage mobility aspects in access such as gateway selection and tracking area list management. MM (also referred to as "EPS MM" or "EMM" in E-UTRAN systems) can refer to all applicable procedures, methods, data storage, etc. That are used to maintain knowledge about a present location of the UE 201, provide user identity confidentiality, and/or perform other like services to users/subscribers. Each UE 201 and the MME 221 can include an MM or EMM sublayer, and an MM context can be established in the UE 201 and the MME 221 when an attach procedure is successfully completed. The MM context can be a data structure or database object that stores MM-related information of the UE 201. The MMEs 221 can be coupled with the HSS 224 via an S6a reference point, coupled with the SGSN 225 via an S3 reference point, and coupled with the S-GW 222 via an S11 reference point.

The SGSN 225 can be a node that serves the UE 201 by tracking the location of an individual UE 201 and performing security functions. In addition, the SGSN 225 can perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 can enable user and bearer information exchange for inter-3GPP access network mobility in idle and/or active states.

The HSS 224 can include a database for network users, including subscription-related information to support the network entities' handling of communication sessions. The EPC 220 can include one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 can enable transfer of subscription and authentication data for authenticating/authorizing user access to the EPC 220 between HSS 224 and the MMEs 221.

The S-GW 222 can terminate the S1 interface 113 ("S1-U" in FIG. 2) toward the RAN 210, and routes data packets between the RAN 210 and the EPC 220. In addition, the S-GW 222 can be a local mobility anchor point for inter-RAN node handovers and also can provide an anchor for inter-3GPP mobility. Other responsibilities can include lawful intercept, charging, and some policy enforcement. The S11 reference point between the S-GW 222 and the MMEs 221 can provide a control plane between the MMEs 221 and the S-GW 222. The S-GW 222 can be coupled with the P-GW 223 via an S5 reference point.

The P-GW 223 can terminate an SGi interface toward a PDN 230. The P-GW 223 can route data packets between the EPC 220 and external networks such as a network including the application server 130 (alternatively referred to as an "AF") via an IP interface 125 (see e.g., FIG. 1). In implementations, the P-GW 223 can be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 can provide user plane tunneling and tunnel management between the P-GW 223 and the S-GW 222. The S5 reference point can also be used for S-GW 222 relocation due to UE 201 mobility and if the S-GW 222 needs to connect to a non-collocated P-GW 223 for the required PDN connectivity. The P-GW 223 can further include a node for policy enforcement and charging data collection (e.g., PCEF (not shown)). Additionally, the SGi reference point between the P-GW 223 and the packet data network (PDN) 230 can be an operator external public, a private PDN, or an intra operator packet data network, for example, for provision of IMS services. The P-GW 223 can be coupled with a PCRF 226 via a Gx reference point.

PCRF 226 is the policy and charging control element of the EPC 220. In a non-roaming scenario, there can be a single PCRF 226 in the Home Public Land Mobile Network (HPLMN) associated with a UE 201's Internet Protocol Connectivity Access Network (IP-CAN) session. In a roaming scenario with local breakout of traffic, there can be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 can be communicatively coupled to the application server 230 via the P-GW 223. The application server 230 can signal the PCRF 226 to indicate a new service flow and select the appropriate QoS and charging parameters. The PCRF 226 can provision this rule into a PCEF (not shown) with the appropriate TFT and QCI, which commences the QoS and charging as specified by the application server 230. The Gx reference point between the PCRF 226 and the P-GW 223 can allow for the transfer of QoS policy and charging rules from the PCRF 226 to PCEF in the P-GW 223. An Rx reference point can reside between the PDN 230 (or "AF 230") and the PCRF 226.

Figure 3:
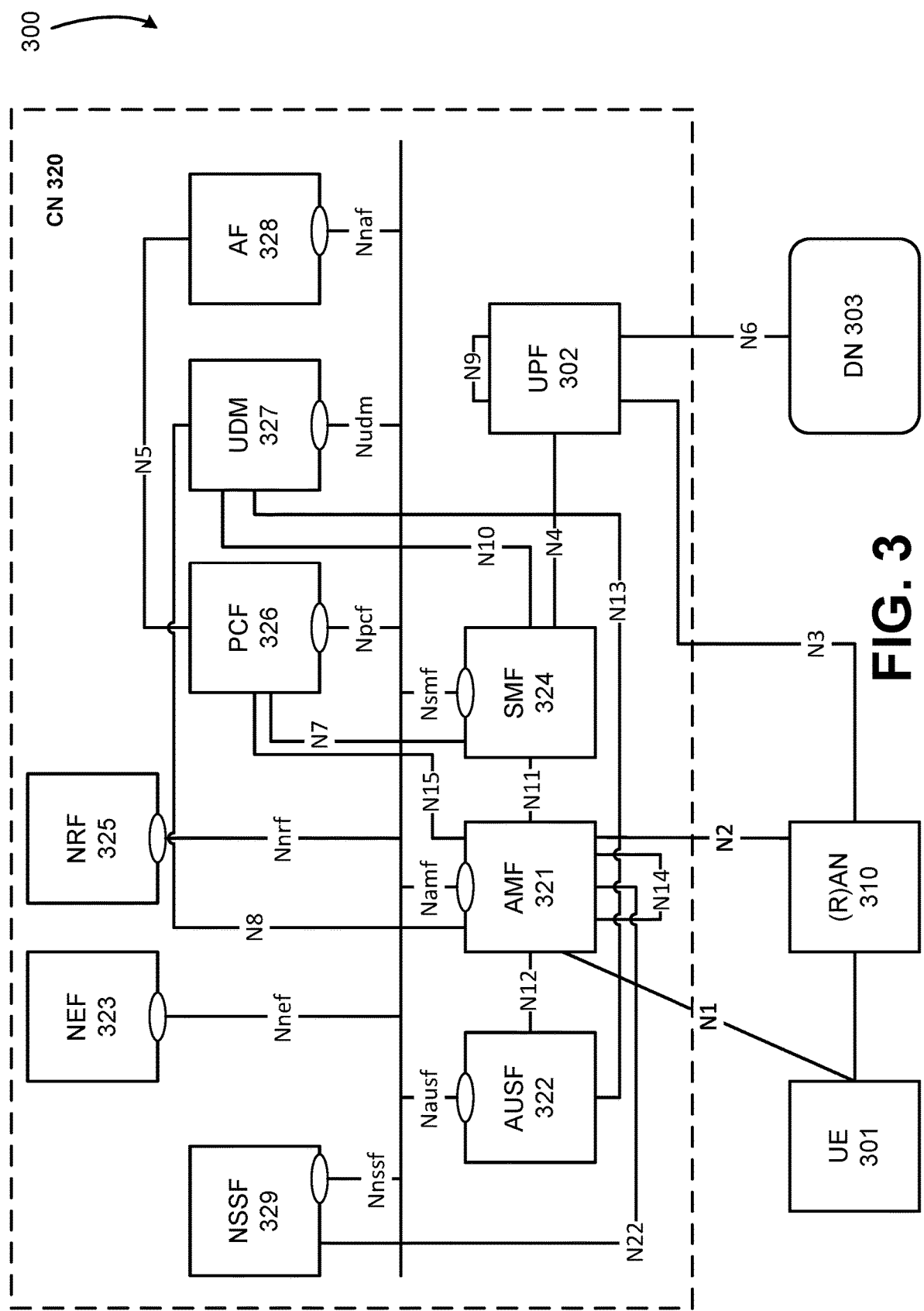
FIG. 3 illustrates an architecture of a system including a second CN, in accordance with one or more implementations.

FIG. 3 illustrates an architecture of a system 300 including a second CN 320, in accordance with one or more implementations. The system 300 is shown to include a UE 301, which can be the same or similar to the UEs 101 and UE 201 discussed previously; a (R)AN 310, which can be the same or similar to the RAN 110 and RAN 210 discussed previously, and which can include RAN nodes 111 discussed previously; and a DN 303, which can be, for example, operator services, Internet access or 3rd party services; and a 5GC 320. The 5GC 320 can include an AUSF 322; an AMF 321; a SMF 324; a NEF 323; a PCF 326; a NRF 325; a UDM 327; an AF 328; a UPF 302; and a NSSF 329.

The UPF 302 can act as an anchor point for intra-RAT and inter-RAT mobility, an external PDU session point of interconnect to DN 303, and a branching point to support multi-homed PDU session. The UPF 302 can also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 can include an uplink classifier to support routing traffic flows to a data network. The DN 303 can represent various network operator services, Internet access, or third party services. DN 303 can include, or be similar to, application server 130 discussed previously. The UPF 302 can interact with the SMF 324 via an N4 reference point between the SMF 324 and the UPF 302.

The AUSF 322 can store data for authentication of UE 301 and handle authentication-related functionality. The AUSF 322 can facilitate a common authentication framework for various access types. The AUSF 322 can communicate with the AMF 321 via an N12 reference point between the AMF 321 and the AUSF 322; and can communicate with the UDM 327 via an N13 reference point between the UDM 327 and the AUSF 322. Additionally, the AUSF 322 can exhibit an Nausf service-based interface.

The AMF 321 can be responsible for registration management (e.g., for registering UE 301, etc.), connection management, reachability management, mobility management, and lawful interception of AMF-related events, and access authentication and authorization. The AMF 321 can be a termination point for the N11 reference point between the AMF 321 and the SMF 324. The AMF 321 can provide transport for SM messages between the UE 301 and the SMF 324, and act as a transparent pro9 for routing SM messages. AMF 321 can also provide transport for SMS messages between UE 301 and an SMSF (not shown by FIG. 3). AMF 321 can act as SEAF, which can include interaction with the AUSF 322 and the UE 301, receipt of an intermediate key that was established as a result of the UE 301 authentication process. Where USIM based authentication is used, the AMF 321 can retrieve the security material from the AUSF 322. AMF 321 can also include a SCM function, which receives a key from the SEA that it uses to derive access-network specific keys. Furthermore, AMF 321 can be a termination point of a RAN CP interface, which can include or be an N2 reference point between the (R)AN 310 and the AMF 321; and the AMF 321 can be a termination point of NAS (N1) signaling, and perform NAS ciphering and integrity protection.

AMF 321 can also support NAS signaling with a UE 301 over an N3 IWF interface. The N3IWF can be used to provide access to untrusted entities. N3IWF can be a termination point for the N2 interface between the (R)AN 310 and the AMF 321 for the control plane, and can be a termination point for the N3 reference point between the (R)AN 310 and the UPF 302 for the user plane. As such, the AMF 321 can handle N2 signaling from the SMF 324 and the AMF 321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 can exhibit an Namf service-based interface, and can be a termination point for an N14 reference point between two AMFs 321 and an N17 reference point between the AMF 321 and a 5G-EIR (not shown by FIG. 3).

The UE 301 can need to register with the AMF 321 in order to receive network services. RM is used to register or deregister the UE 301 with the network (e.g., AMF 321), and establish a UE context in the network (e.g., AMF 321). The UE 301 can operate in an RM-REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM REGISTERED state, the UE 301 is registered with the network, and the UE context in AMF 321 can hold a valid location or routing information for the UE 301 so the UE 301 is reachable by the AMF 321. In the RM-REGISTERED state, the UE 301 can perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 can store one or more RM contexts for the UE 301, where each RM context is associated with a specific access to the network. The RM context can be a data structure, database object, etc. That indicates or stores, inter alia, a registration state per access type and the periodic update timer. The AMF 321 can also store a 5GC MM context that can be the same or similar to the (E)MM context discussed previously. In various implementations, the AMF 321 can store a CE mode B Restriction parameter of the UE 301 in an associated MM context or RM context. The AMF 321 can also derive the value, when needed, from the UE's usage setting parameter already stored in the UE context (and/or MM/RM context).

CM can be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. The UE 301 can operate in one of two CM states, CM-IDLE mode or CM-CONNECTED mode. When the UE 301 is operating in the CM-IDLE state/mode, the UE 301 can have no NAS signaling connection established with the AMF 321 over the N1 interface, and there can be (R)AN 310 signaling connection (e.g., N2 and/or N3 connections) for the UE 301. When the UE 301 is operating in the CM-CONNECTED state/mode, the UE 301 can have an established NAS signaling connection with the AMF 321 over the N1 interface, and there can be a (R)AN 310 signaling connection (e.g., N2 and/or N3 connections) for the UE 301. Establishment of an N2 connection between the (R)AN 310 and the AMF 321 can cause the UE 301 to transition from CM-IDLE mode to CM-CONNECTED mode, and the UE 301 can transition from the CM-CONNECTED mode to the CM-IDLE mode when N2 signaling between the (R)AN 310 and the AMF 321 is released.

The SMF 324 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 301 and a data network (DN) 303 identified by a Data Network Name (DNN). PDU sessions can be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 can trigger a specific application in the UE 301. In response to receipt of the trigger message, the UE 301 can pass the trigger message (or relevant parts/information of the trigger message) to one or more identified applications in the UE 301. The identified application(s) in the UE 301 can establish a PDU session to a specific DNN. The SMF 324 can check whether the UE 301 requests are compliant with user subscription information associated with the UE 301. In this regard, the SMF 324 can retrieve and/or request to receive update notifications on SMF 324 level subscription data from the UDM 327.

The SMF 324 can include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 324 can be included in the system 300, which can be between another SMF 324 in a visited network and the SMF 324 in the home network in roaming scenarios. Additionally, the SMF 324 can exhibit the Nsmf service-based interface.

The NEF 323 can provide means for securely exposing the services and capabilities provided by 3GPP network functions for third party, internal exposure/re-exposure, Application Functions (e.g., AF 328), edge computing or fog computing systems, etc. In such implementations, the NEF 323 can authenticate, authorize, and/or throttle the AFs. NEF 323 can also translate information exchanged with the AF 328 and information exchanged with internal network functions. For example, the NEF 323 can translate between an AF-Service-Identifier and an internal 5GC information. NEF 323 can also receive information from other network functions (NFs) based on exposed capabilities of other network functions. This information can be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 can exhibit an Nnef service-based interface.

The NRF 325 can support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 325 can exhibit the Nnrf service-based interface.

The PCF 326 can provide policy rules to control plane function(s) to enforce them, and can also support unified policy framework to govern network behavior. The PCF 326 can also implement an FE to access subscription information relevant for policy decisions in a UDR of the UDM 327. The PCF 326 can communicate with the AMF 321 via an N15 reference point between the PCF 326 and the AMF 321, which can include a PCF 326 in a visited network and the AMF 321 in case of roaming scenarios. The PCF 326 can communicate with the AF 328 via an N5 reference point between the PCF 326 and the AF 328; and with the SMF 324 via an N7 reference point between the PCF 326 and the SMF 324. The system 300 and/or CN 320 can also include an N24 reference point between the PCF 326 (in the home network) and a PCF 326 in a visited network. Additionally, the PCF 326 can exhibit an Npcf service-based interface.

The UDM 327 can handle subscription-related information to support the network entities' handling of communication sessions, and can store subscription data of UE 301. For example, subscription data can be communicated between the UDM 327 and the AMF 321 via an N8 reference point between the UDM 327 and the AMF. The UDM 327 can include two parts, an application FE and a UDR (the FE and UDR are not shown by FIG. 3). The UDR can store subscription data and policy data for the UDM 327 and the PCF 326, and/or structured data for exposure and application data (including PFDs for application detection, application request information for multiple UEs 301) for the NEF 323. The Nudr service-based interface can be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM can include a UDM-FE, which is in charge of processing credentials, location management, subscription management, and so on. Several different front ends can serve the same user in different transactions. The UDM-FE accesses subscription information stored in the UDR and performs authentication credential processing, user identification handling, access authorization, registration/mobility management, and subscription management. The UDR can interact with the SMF 324 via an N10 reference point between the UDM 327 and the SMF 324. UDM 327 can also support SMS management, wherein an SMS-FE implements the similar application logic as discussed previously. Additionally, the UDM 327 can exhibit the Nudm service-based interface.

The AF 328 can provide application influence on traffic routing, provide access to the NCE, and interact with the policy framework for policy control. The NCE can be a mechanism that allows the 5GC 320 and AF 328 to provide information to each other via NEF 323, which can be used for edge computing implementations. In such implementations, the network operator and third party services can be hosted close to the UE 301 access point of attachment to achieve an efficient service delivery through the reduced end-to-end latency and load on the transport network. For edge computing implementations, the 5GC can select a UPF 302 close to the UE 301 and execute traffic steering from the UPF 302 to DN 303 via the N6 interface. This can be based on the UE subscription data, UE location, and information provided by the AF 328. In this way, the AF 328 can influence UPF (re)selection and traffic routing. Based on operator deployment, when AF 328 is considered to be a trusted entity, the network operator can permit AF 328 to interact directly with relevant NFs. Additionally, the AF 328 can exhibit an Naf service-based interface.

The NSSF 329 can select a set of network slice instances serving the UE 301. The NSSF 329 can also determine allowed NSSAI and the mapping to the subscribed S-NSSAIs, if needed. The NSSF 329 can also determine the AMF set to be used to serve the UE 301, or a list of candidate AMF(s) 321 based on a suitable configuration and possibly by querying the NRF 325. The selection of a set of network slice instances for the UE 301 can be triggered by the AMF 321 with which the UE 301 is registered by interacting with the NSSF 329, which can lead to a change of AMF 321. The NSSF 329 can interact with the AMF 321 via an N22 reference point between AMF 321 and NSSF 329; and can communicate with another NSSF 329 in a visited network via an N31 reference point (not shown by FIG. 3). Additionally, the NSSF 329 can exhibit an Nnssf service-based interface.

As discussed previously, the CN 320 can include an SMSF, which can be responsible for SMS subscription checking and verification, and relaying SM messages to/from the UE 301 to/from other entities, such as an SMS-GMSC/IWMSC/SMS-router. The SMS can also interact with AMF 321 and UDM 327 for a notification procedure that the UE 301 is available for SMS transfer (e.g., set a UE not reachable flag, and notifying UDM 327 when UE 301 is available for SMS).

The CN 120 can also include other elements that are not shown by FIG. 3, such as a Data Storage system/architecture, a 5G-EIR, a SEPP, and the like. The Data Storage system can include a SDSF, an UDSF, and/or the like. Any NF can store and retrieve unstructured data into/from the UDSF (e.g., UE contexts), via N18 reference point between any NF and the UDSF (not shown by FIG. 3). Individual NFs can share a UDSF for storing their respective unstructured data or individual NFs can each have their own UDSF located at or near the individual NFs. Additionally, the UDSF can exhibit an Nudsf service-based interface (not shown by FIG. 3). The 5G-EIR can be an NF that checks the status of PEI for determining whether particular equipment/entities are blacklisted from the network; and the SEPP can be a non-transparent pro9 that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 3 for clarity. In one example, the CN 320 can include an Nx interface, which is an inter-CN interface between the MME (e.g., MME 221) and the AMF 321 in order to enable interworking between CN 320 and CN 220. Other example interfaces/reference points can include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
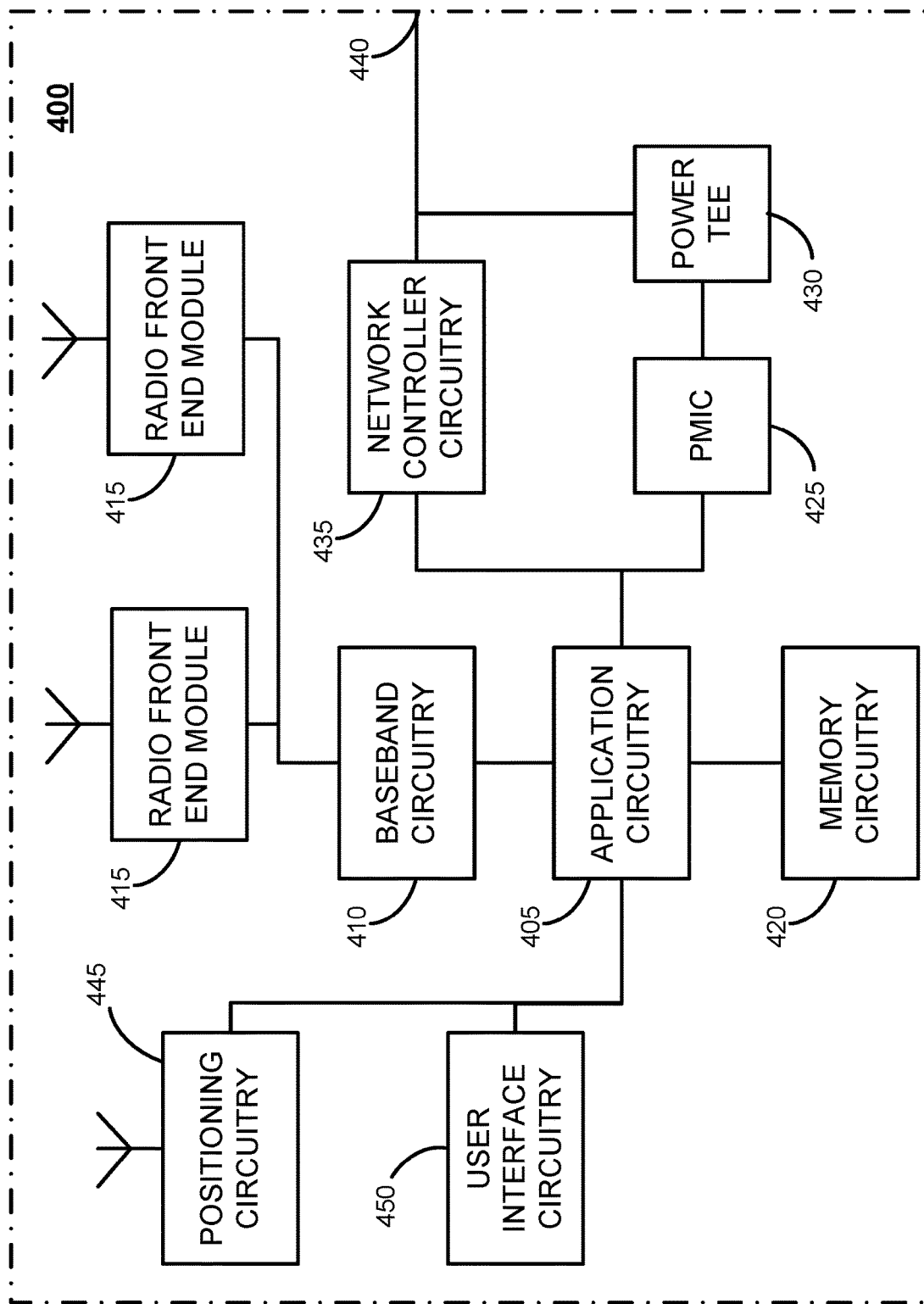
FIG. 4 illustrates an example of infrastructure equipment in accordance with one or more implementations.

FIG. 4 illustrates an example of infrastructure equipment 400 in accordance with one or more implementations. The infrastructure equipment 400 (or "system 400") can be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some implementations, the device 400 can include additional elements such as, for example, memory/storage, display, camera, sensor, or input/output (I/O) interface. In other implementations, the components described below can be included in more than one device. For example, said circuitries can be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 can be coupled with or can include memory/storage elements and can be configured to execute instructions stored in the memory/storage to enable various applications or operating systems to run on the system 400. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some implementations, the application circuitry 405 can include, or can be, a special-purpose processor/controller to operate according to the various implementations herein. As examples, the processor(s) of application circuitry 405 can include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some implementations, the system 400 does not utilize application circuitry 405, and instead can include a special-purpose processor/controller to process IP data received from an EPC or 5GC, for example.

In some implementations, the application circuitry 405 can include one or more hardware accelerators, which can be microprocessors, programmable processing devices, or the like. The one or more hardware accelerators can include, for example, computer vision (CV) and/or deep learning (DL) accelerators. As examples, the programmable processing devices can be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 can include logic blocks or logic fabric, and other interconnected resources that can be programmed to perform various functions, such as the procedures, methods, functions, etc. Of the various implementations discussed herein. In such implementations, the circuitry of application circuitry 405 can include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 410 can be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 6.

User interface circuitry 450 can include one or more user interfaces designed to enable user interaction with the system 400 or peripheral component interfaces designed to enable peripheral component interaction with the system 400. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The radio front end modules (RFEMs) 415 can include a millimeter wave (mmWave) RFEM and one or more sub-mmWave radio frequency integrated circuits (RFICs). In some implementations, the one or more sub-mmWave RFICs can be physically separated from the mmWave RFEM. The RFICs can include connections to one or more antennas or antenna arrays (see e.g., antenna array 611 of FIG. 6 infra), and the RFEM can be connected to multiple antennas. In alternative implementations, both mmWave and sub-mmWave radio functions can be implemented in the same physical RFEM 415, which incorporates both mmWave antennas and sub-mmWave.

The memory circuitry 420 can include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and can incorporate the three-dimensional (3D) cross-point (XPOINT) memories from Intel® and Micron®. Memory circuitry 420 can be implemented as one or more of solder down packaged integrated circuits, socketed memory modules and plug-in memory cards.

The PMIC 425 can include voltage regulators, surge protectors, power alarm detection circuitry, and one or more backup power sources such as a battery or capacitor. The power alarm detection circuitry can detect one or more of brown out (under-voltage) and surge (over-voltage) conditions. The power tee circuitry 430 can provide for electrical power drawn from a network cable to provide both power supply and data connectivity to the infrastructure equipment 400 using a single cable.

The network controller circuitry 435 can provide connectivity to a network using a standard network interface protocol such as Ethernet, Ethernet over GRE Tunnels, Ethernet over Multiprotocol Label Switching (MPLS), or some other suitable protocol. Network connectivity can be provided to/from the infrastructure equipment 400 via network interface connector 440 using a physical connection, which can be electrical (commonly referred to as a "copper interconnect"), optical, or wireless. The network controller circuitry 435 can include one or more dedicated processors and/or FPGAs to communicate using one or more of the aforementioned protocols. In some implementations, the network controller circuitry 435 can include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 includes various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 445 can include a Micro-Technology for Positioning, Navigation, and Timing (Micro-PNT) IC that uses a master timing clock to perform position tracking/estimation without GNSS assistance. The positioning circuitry 445 can also be part of, or interact with, the baseband circuitry 410 and/or RFEMs 415 to communicate with the nodes and components of the positioning network. The positioning circuitry 445 can also provide position data and/or time data to the application circuitry 405, which can use the data to synchronize operations with various infrastructure (e.g., RAN nodes 111, etc.), or the like.

The components shown by FIG. 4 can communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX can be a proprietary bus, for example, used in a SoC based system. Other bus/IX systems can be included, such as an I2C interface, an SPI interface, point to point interfaces, and a power bus, among others.

Figure 5:
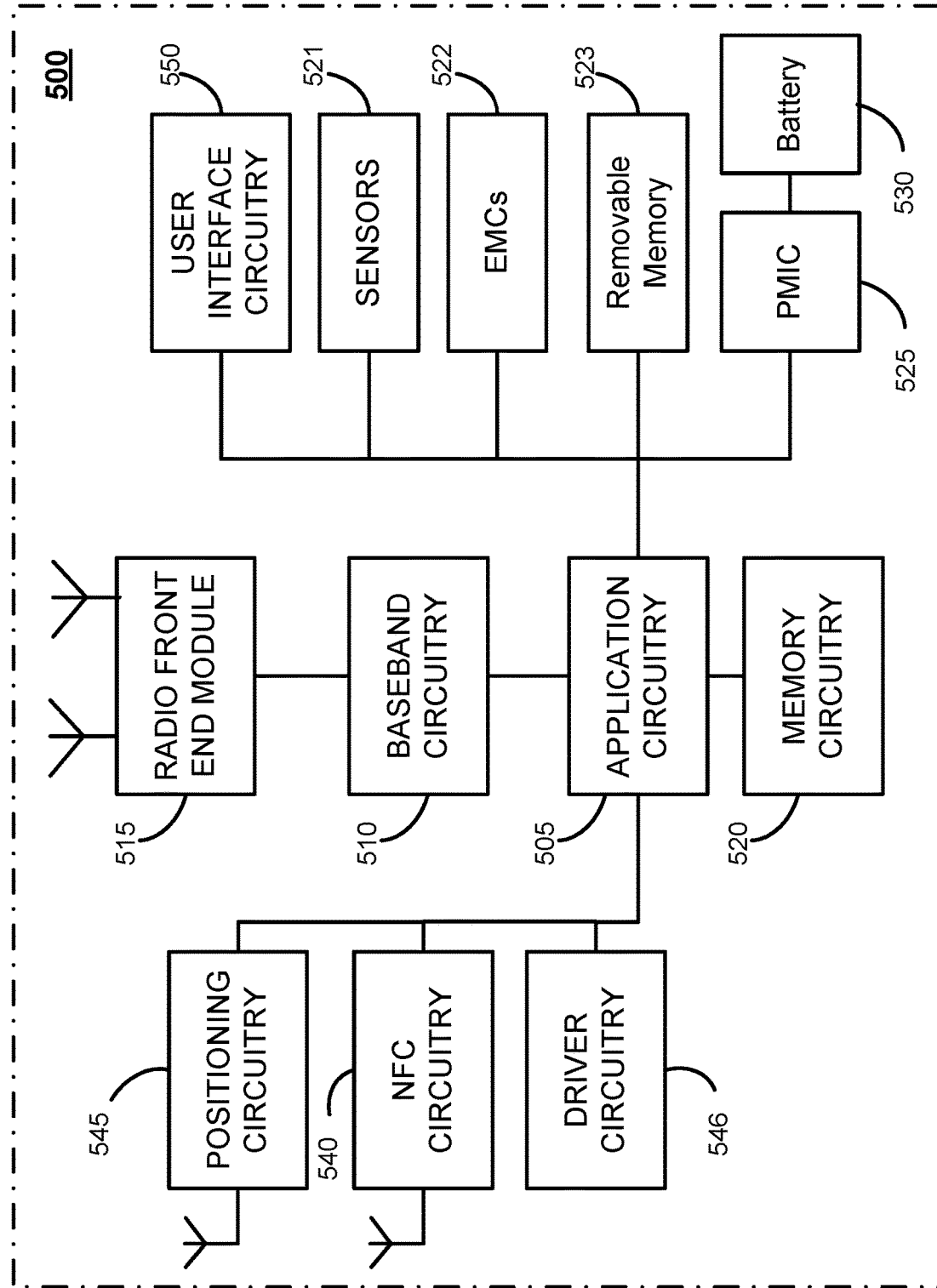
FIG. 5 illustrates an example of a platform (or "device") in accordance with one or more implementations.

FIG. 5 illustrates an example of a platform 500 (or "device 500") in accordance with one or more implementations. In implementations, the computer platform 500 can be suitable for use as UEs 101, 201, 301, application servers 130, and/or any other element/device discussed herein. The platform 500 can include any combinations of the components shown in the example. The components of platform 500 can be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown can be omitted, additional components can be present, and different arrangement of the components shown can occur in other implementations.

Application circuitry 505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 can be coupled with or can include memory/storage elements and can be configured to execute instructions stored in the memory/storage to enable various applications or operating systems to run on the system 500. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 can include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 405 can include, or can be, a special-purpose processor/controller to operate according to the various implementations herein.

As examples, the processor(s) of application circuitry 505 can include an Apple A-series processor. The processors of the application circuitry 505 can also be one or more of an Intel® Architecture Core™ based processor, such as a Quark™, an Atom™, an i3, an i5, an i7, or an MCU-class processor, or another such processor available from Intel® Corporation, Santa Clara, Calif.; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 can be a part of a system on a chip (SoC) in which the application circuitry 505 and other components are formed into a single integrated circuit.

Additionally or alternatively, application circuitry 505 can include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 505 can include logic blocks or logic fabric, and other interconnected resources that can be programmed to perform various functions, such as the procedures, methods, functions, etc. Of the various implementations discussed herein. In such implementations, the circuitry of application circuitry 505 can include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up tables (LUTs) and the like.

The baseband circuitry 510 can be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 6.

The RFEMs 515 can include a millimeter wave (mm-Wave) RFEM and one or more sub-mmWave radio frequency integrated circuits (RFICs). In some implementations, the one or more sub-mmWave RFICs can be physically separated from the mmWave RFEM. The RFICs can include connections to one or more antennas or antenna arrays (see e.g., antenna array 611 of FIG. 6 infra), and the RFEM can be connected to multiple antennas. In alternative implementations, both mmWave and sub-mmWave radio functions can be implemented in the same physical RFEM 515, which incorporates both mmWave antennas and sub-mmWave.

The memory circuitry 520 can include any number and type of memory devices used to provide for a given amount of system memory. As examples, the memory circuitry 520 can include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 can be developed in accordance with a Joint Electron Devices Engineering Council (JEDEC) low power double data rate (LPDDR)-based design, such as LPDDR2, LPDDR3, LPDDR4, or the like. Memory circuitry 520 can be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 can be on-die memory or registers associated with the application circuitry 505. To provide for persistent storage of information such as data, applications, operating systems and so forth, memory circuitry 520 can include one or more mass storage devices, which can include, inter alia, a solid state disk drive (SSDD), hard disk drive (HDD), a micro HDD, resistance change memories, phase change memories, holographic memories, or chemical memories, among others. For example, the computer platform 500 can incorporate the three-dimensional (3D) cross-point (XPOINT) memories from Intel® and Micron®.

Removable memory circuitry 523 can include devices, circuitry, enclosures/housings, ports or receptacles, etc. Used to couple portable data storage devices with the platform 500. These portable data storage devices can be used for mass storage purposes, and can include, for example, flash memory cards (e.g., Secure Digital (SD) cards, microSD cards, xD picture cards, and the like), and USB flash drives, optical discs, external HDDs, and the like.

The platform 500 can also include interface circuitry (not shown) that is used to connect external devices with the platform 500. The external devices connected to the platform 500 via the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUS) including accelerometers, gyroscopes, and/or magnetometers; microelectromechanical systems (MEMS) or nanoelectromechanical systems (NEMS) including 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 522 include devices, modules, or subsystems whose purpose is to enable platform 500 to change its state, position, and/or orientation, or move or control a mechanism or (sub)system. Additionally, EMCs 522 can be configured to generate and send messages/signaling to other components of the platform 500 to indicate a current state of the EMCs 522. Examples of the EMCs 522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In implementations, platform 500 is configured to operate one or more EMCs 522 based on one or more captured events and/or instructions or control signals received from a service provider and/or various clients.

In some implementations, the interface circuitry can connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 includes various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 545 can include a Micro-PNT IC that uses a master timing clock to perform position tracking/estimation without GNSS assistance. The positioning circuitry 545 can also be part of, or interact with, the baseband circuitry 410 and/or RFEMs 515 to communicate with the nodes and components of the positioning network. The positioning circuitry 545 can also provide position data and/or time data to the application circuitry 505, which can use the data to synchronize operations with various infrastructure (e.g., radio base stations), for turn-by-turn navigation applications, or the like.

In some implementations, the interface circuitry can connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 includes an NFC controller coupled with an antenna element and a processor coupled with the NFC controller. The NFC controller can be a chip/IC providing NFC functionalities to the NFC circuitry 540 by executing NFC controller firmware and an NFC stack. The NFC stack can be executed by the processor to control the NFC controller, and the NFC controller firmware can be executed by the NFC controller to control the antenna element to emit short-range RF signals. The RF signals can power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 can include software and hardware elements that operate to control particular devices that are embedded in the platform 500, attached to the platform 500, or otherwise communicatively coupled with the platform 500. The driver circuitry 546 can include individual drivers allowing other components of the platform 500 to interact with or control various input/output (I/O) devices that can be present within, or connected to, the platform 500. For example, driver circuitry 546 can include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") can manage power provided to various components of the platform 500. In particular, with respect to the baseband circuitry 510, the PMIC 525 can control power-source selection, voltage scaling, battery charging, or DC-to-DC conversion. The PMIC 525 can often be included when the platform 500 is capable of being powered by a battery 530, for example, when the device is included in a UE 101, 201, 301.

In some implementations, the PMIC 525 can control, or otherwise be part of, various power saving mechanisms of the platform 500. For example, if the platform 500 is in an RRC_Connected state, where it is still connected to the RAN node as it expects to receive traffic shortly, then it can enter a state known as Discontinuous Reception Mode (DRX) after a period of inactivity. During this state, the platform 500 can power down for brief intervals of time and thus save power. If there is no data traffic activity for an extended period of time, then the platform 500 can transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 does not receive data in this state; in order to receive data, it must transition back to RRC_Connected state. An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

A battery 530 can power the platform 500, although in some examples the platform 500 can be mounted deployed in a fixed location, and can have a power supply coupled to an electrical grid. The battery 530 can be a lithium ion battery, a metal-air battery, such as a zinc-air battery, an aluminum-air battery, a lithium-air battery, and the like. In some implementations, such as in V2X applications, the battery 530 can be a typical lead-acid automotive battery.

In some implementations, the battery 530 can be a "smart battery," which includes or is coupled with a Battery Management System (BMS) or battery monitoring integrated circuitry. The BMS can be included in the platform 500 to track the state of charge (SoCh) of the battery 530. The BMS can be used to monitor other parameters of the battery 530 to provide failure predictions, such as the state of health (SoH) and the state of function (SoF) of the battery 530. The BMS can communicate the information of the battery 530 to the application circuitry 505 or other components of the platform 500. The BMS can also include an analog-to-digital (ADC) convertor that allows the application circuitry 505 to directly monitor the voltage of the battery 530 or the current flow from the battery 530. The battery parameters can be used to determine actions that the platform 500 can perform, such as transmission frequency, network operation, detecting frequency, and the like.

A power block, or other power supply coupled to an electrical grid can be coupled with the BMS to charge the battery 530. In some examples, the power block XS30 can be replaced with a wireless power receiver to obtain the power wirelessly, for example, through a loop antenna in the computer platform 500. In these examples, a wireless battery charging circuit can be included in the BMS. The specific charging circuits chosen can depend on the size of the battery 530, and thus, the current required. The charging can be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry can include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 500. The output device circuitry can also include speakers or other audio emitting devices, printer(s), and/or the like. In some implementations, the sensor circuitry 521 can be used as the input device circuitry (e.g., an image capture device, motion capture device, or the like) and one or more EMCs can be used as the output device circuitry (e.g., an actuator to provide haptic feedback or the like). In another example, NFC circuitry including an NFC controller coupled with an antenna element and a processing device can be included to read electronic tags and/or connect with another NFC-enabled device. Peripheral component interfaces can include, but are not limited to, a non-volatile memory port, a USB port, an audio jack, a power supply interface, etc.

Although not shown, the components of platform 500 can communicate with one another using a suitable bus or interconnect (IX) technology, which can include any number of technologies, including ISA, EISA, PCI, PCIx, PCIe, a Time-Trigger Protocol (TTP) system, a FlexRay system, or any number of other technologies. The bus/IX can be a proprietary bus/IX, for example, used in a SoC based system. Other bus/IX systems can be included, such as an I2C interface, an SPI interface, point-to-point interfaces, and a power bus, among others.

Figure 6:
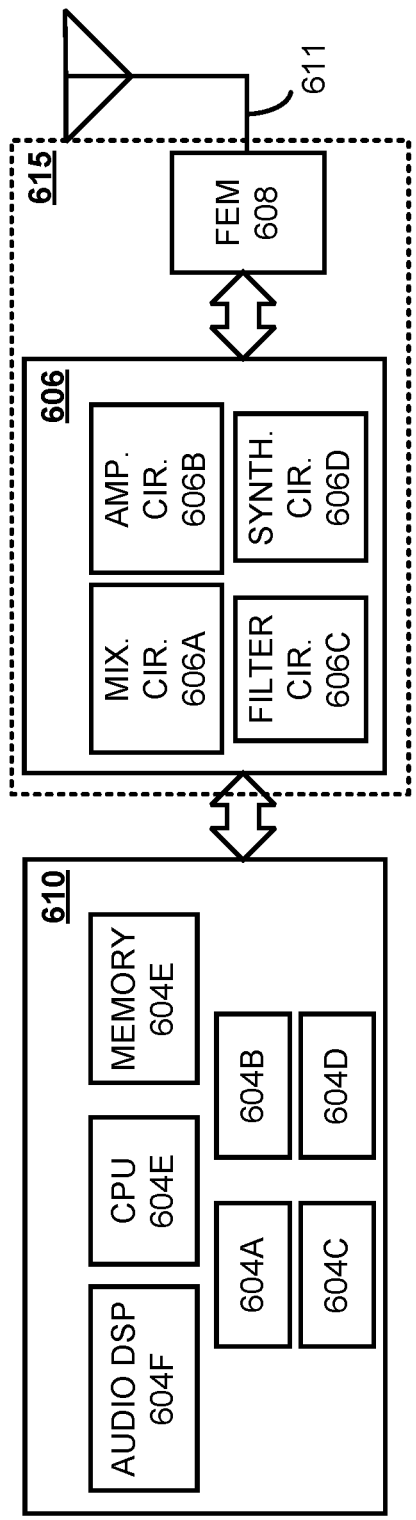
FIG. 6 illustrates example components of baseband circuitry and radio front end modules (RFEM) in accordance with one or more implementations.

FIG. 6 illustrates example components of baseband circuitry 610 and radio front end modules (RFEM) 615 in accordance with one or more implementations. The baseband circuitry 610 corresponds to the baseband circuitry 410 and 510 of FIGS. 4 and 5, respectively. The RFEM 615 corresponds to the RFEM 415 and 515 of FIGS. 4 and 5, respectively. As shown, the RFEMs 615 can include Radio Frequency (RF) circuitry 606, front-end module (FEM) circuitry 608, antenna array 611 coupled together at least as shown.

The baseband circuitry 610 includes circuitry and/or control logic configured to carry out various radio/network protocol and radio control functions that enable communication with one or more radio networks via the RF circuitry 606. The radio control functions can include, but are not limited to, signal modulation/demodulation, encoding/decoding, radio frequency shifting, etc. In some implementations, modulation/demodulation circuitry of the baseband circuitry 610 can include Fast-Fourier Transform (FFT), precoding, or constellation mapping/demapping functionality. In some implementations, encoding/decoding circuitry of the baseband circuitry 610 can include convolution, tail-biting convolution, turbo, Viterbi, or Low Density Parity Check (LDPC) encoder/decoder functionality. Implementations of modulation/demodulation and encoder/decoder functionality are not limited to these examples and can include other suitable functionality in other implementations. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry 405/505 (see FIGS. 4 and 5) for generation and processing of the baseband signals and for controlling operations of the RF circuitry 606. The baseband circuitry 610 can handle various radio control functions.

The aforementioned circuitry and/or control logic of the baseband circuitry 610 can include one or more single or multi-core processors. For example, the one or more processors can include a 3G baseband processor 604A, a 4G/LTE baseband processor 604B, a 5G/NR baseband processor 604C, or some other baseband processor(s) 604D for other existing generations, generations in development or to be developed in the future (e.g., sixth generation (6G), etc.). In other implementations, some or all of the functionality of baseband processors 604A-D can be included in modules stored in the memory 604G and executed via a Central Processing Unit (CPU) 604E. In other implementations, some or all of the functionality of baseband processors 604A-D can be provided as hardware accelerators (e.g., FPGAs, ASICs, etc.) loaded with the appropriate bit streams or logic blocks stored in respective memory cells. In various implementations, the memory 604G can store program code of a real-time OS (RTOS), which when executed by the CPU 604E (or other baseband processor), is to cause the CPU 604E (or other baseband processor) to manage resources of the baseband circuitry 610, schedule tasks, etc. Examples of the RTOS can include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression/decompression and echo cancellation and can include other suitable processing elements in other implementations.

In some implementations, each of the processors 604A-604E include respective memory interfaces to send/receive data to/from the memory 604G. The baseband circuitry 610 can further include one or more interfaces to communicatively couple to other circuitries/devices, such as an interface to send/receive data to/from memory external to the baseband circuitry 610; an application circuitry interface to send/receive data to/from the application circuitry 405/505 of FIG. 4-XT); an RF circuitry interface to send/receive data to/from RF circuitry 606 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 525.

In alternate implementations (which can be combined with the above described implementations), baseband circuitry 610 includes one or more digital baseband systems, which are coupled with one another via an interconnect subsystem and to a CPU subsystem, an audio subsystem, and an interface subsystem. The digital baseband subsystems can also be coupled to a digital baseband interface and a mixed-signal baseband subsystem via another interconnect subsystem. Each of the interconnect subsystems can include a bus system, point-to-point connections, network-on-chip (NOC) structures, and/or some other suitable bus or interconnect technology, such as those discussed herein. The audio subsystem can include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 can include protocol processing circuitry with one or more instances of control circuitry (not shown) to provide control functions for the digital baseband circuitry and/or radio frequency circuitry (e.g., the radio front end modules 615).

Although not shown by FIG. 6, in some implementations, the baseband circuitry 610 includes individual processing device(s) to operate one or more wireless communication protocols (e.g., a "multi-protocol baseband processor" or "protocol processing circuitry") and individual processing device(s) to implement PHY layer functions. In these implementations, the PHY layer functions include the aforementioned radio control functions. In these implementations, the protocol processing circuitry operates or implements various protocol layers/entities of one or more wireless communication protocols. In a first example, the protocol processing circuitry can operate LTE protocol entities and/or 5G/NR protocol entities when the baseband circuitry 610 and/or RF circuitry 606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry can operate one or more IEEE-based protocols when the baseband circuitry 610 and/or RF circuitry 606 are part of a Wi-Fi communication system. In the second example, the protocol processing circuitry would operate Wi-Fi MAC and logical link control (LLC) functions. The protocol processing circuitry can include one or more memory structures (e.g., 604G) to store program code and data for operating the protocol functions, as well as one or more processing cores to execute the program code and perform various operations using the data. The baseband circuitry 610 can also support radio communications for more than one wireless protocol.

The various hardware elements of the baseband circuitry 610 discussed herein can be implemented, for example, as a solder-down substrate including one or more integrated circuits (ICs), a single packaged IC soldered to a main circuit board or a multi-chip module containing two or more ICs. In one example, the components of the baseband circuitry 610 can be suitably combined in a single chip or chipset, or disposed on a same circuit board. In another example, some or all of the constituent components of the baseband circuitry 610 and RF circuitry 606 can be implemented together such as, for example, a system on a chip (SoC) or System-in-Package (SiP). In another example, some or all of the constituent components of the baseband circuitry 610 can be implemented as a separate SoC that is communicatively coupled with and RF circuitry 606 (or multiple instances of RF circuitry 606). In yet another example, some or all of the constituent components of the baseband circuitry 610 and the application circuitry 405/505 can be implemented together as individual SoCs mounted to a same circuit board (e.g., a "multi-chip package").

In some implementations, the baseband circuitry 610 can provide for communication compatible with one or more radio technologies. For example, in some implementations, the baseband circuitry 610 can support communication with an E-UTRAN or other WMAN, a WLAN, a WPAN. Implementations in which the baseband circuitry 610 is configured to support radio communications of more than one wireless protocol can be referred to as multi-mode baseband circuitry.

RF circuitry 606 can enable communication with wireless networks using modulated electromagnetic radiation through a non-solid medium. In various implementations, the RF circuitry 606 can include switches, filters, amplifiers, etc. To facilitate the communication with the wireless network. RF circuitry 606 can include a receive signal path, which can include circuitry to down-convert RF signals received from the FEM circuitry 608 and provide baseband signals to the baseband circuitry 610. RF circuitry 606 can also include a transmit signal path, which can include circuitry to up-convert baseband signals provided by the baseband circuitry 610 and provide RF output signals to the FEM circuitry 608 for transmission.

In some implementations, the receive signal path of the RF circuitry 606 can include mixer circuitry 606a, amplifier circuitry 606b and filter circuitry 606c. In some implementations, the transmit signal path of the RF circuitry 606 can include filter circuitry 606c and mixer circuitry 606a. RF circuitry 606 can also include synthesizer circuitry 606d for synthesizing a frequency for use by the mixer circuitry 606a of the receive signal path and the transmit signal path. In some implementations, the mixer circuitry 606a of the receive signal path can be configured to down-convert RF signals received from the FEM circuitry 608 based on the synthesized frequency provided by synthesizer circuitry 606d. The amplifier circuitry 606b can be configured to amplify the down-converted signals and the filter circuitry 606c can be a low-pass filter (LPF) or band-pass filter (BPF) configured to remove unwanted signals from the down-converted signals to generate output baseband signals. Output baseband signals can be provided to the baseband circuitry 610 for further processing. In some implementations, the output baseband signals can be zero-frequency baseband signals, although this is not a requirement. In some implementations, mixer circuitry 606a of the receive signal path can include passive mixers, although the scope of the implementations is not limited in this respect.

In some implementations, the mixer circuitry 606a of the transmit signal path can be configured to up-convert input baseband signals based on the synthesized frequency provided by the synthesizer circuitry 606d to generate RF output signals for the FEM circuitry 608. The baseband signals can be provided by the baseband circuitry 610 and can be filtered by filter circuitry 606c.

In some implementations, the mixer circuitry 606a of the receive signal path and the mixer circuitry 606a of the transmit signal path can include two or more mixers and can be arranged for quadrature downconversion and upconversion, respectively. In some implementations, the mixer circuitry 606a of the receive signal path and the mixer circuitry 606a of the transmit signal path can include two or more mixers and can be arranged for image rejection (e.g., Hartley image rejection). In some implementations, the mixer circuitry 606a of the receive signal path and the mixer circuitry 606a of the transmit signal path can be arranged for direct downconversion and direct upconversion, respectively. In some implementations, the mixer circuitry 606a of the receive signal path and the mixer circuitry 606a of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 606 can include analog-to-digital converter (ADC) and digital-to-analog converter (DAC) circuitry and the baseband circuitry 610 can include a digital baseband interface to communicate with the RF circuitry 606.

In some dual-mode implementations, a separate radio IC circuitry can be provided for processing signals for each spectrum, although the scope of the implementations is not limited in this respect.

In some implementations, the synthesizer circuitry 606d can be a fractional-N synthesizer or a fractional N/N+1 synthesizer, although the scope of the implementations is not limited in this respect as other types of frequency synthesizers can be suitable. For example, synthesizer circuitry 606d can be a delta-sigma synthesizer, a frequency multiplier, or a synthesizer including a phase-locked loop with a frequency divider.

The synthesizer circuitry 606d can be configured to synthesize an output frequency for use by the mixer circuitry 606a of the RF circuitry 606 based on a frequency input and a divider control input. In some implementations, the synthesizer circuitry 606d can be a fractional N/N+1 synthesizer.

In some implementations, frequency input can be provided by a voltage controlled oscillator (VCO), although that is not a requirement. Divider control input can be provided by either the baseband circuitry 610 or the application circuitry 405/505 depending on the desired output frequency. In some implementations, a divider control input (e.g., N) can be determined from a look-up table based on a channel indicated by the application circuitry 405/505.

Synthesizer circuitry 606d of the RF circuitry 606 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 606d can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 606 can include an IQ/polar converter.

FEM circuitry 608 can include a receive signal path, which can include circuitry configured to operate on RF signals received from antenna array 611, amplify the received signals and provide the amplified versions of the received signals to the RF circuitry 606 for further processing. FEM circuitry 608 can also include a transmit signal path, which can include circuitry configured to amplify signals for transmission provided by the RF circuitry 606 for transmission by one or more of antenna elements of antenna array 611. In various implementations, the amplification through the transmit or receive signal paths can be done solely in the RF circuitry 606, solely in the FEM circuitry 608, or in both the RF circuitry 606 and the FEM circuitry 608.

In some implementations, the FEM circuitry 608 can include a TX/RX switch to switch between transmit mode and receive mode operation. The FEM circuitry 608 can include a receive signal path and a transmit signal path. The receive signal path of the FEM circuitry 608 can include an LNA to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission by one or more antenna elements of the antenna array 611.

The antenna array 611 includes one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 611 including one or more antenna elements (not shown). The antenna elements can be omnidirectional, direction, or a combination thereof. The antenna elements can be formed in a multitude of arranges as are known and/or discussed herein. The antenna array 611 can include microstrip antennas or printed antennas that are fabricated on the surface of one or more printed circuit boards. The antenna array 611 can be formed in as a patch of metal foil (e.g., a patch antenna) in a variety of shapes, and can be coupled with the RF circuitry 606 and/or FEM circuitry 608 using metal transmission lines or the like.

Processors of the application circuitry 405/505 and processors of the baseband circuitry 610 can be used to execute elements of one or more instances of a protocol stack. For example, processors of the baseband circuitry 610, alone or in combination, can be used execute Layer 3, Layer 2, or Layer 1 functionality, while processors of the application circuitry 405/505 can utilize data (e.g., packet data) received from these layers and further execute Layer 4 functionality (e.g., TCP and UDP layers). As referred to herein, Layer 3 can include a RRC layer, described in further detail below. As referred to herein, Layer 2 can include a MAC layer, an RLC layer, and a PDCP layer, described in further detail below. As referred to herein, Layer 1 can include a PHY layer of a UE/RAN node, described in further detail below.

Figure 7:
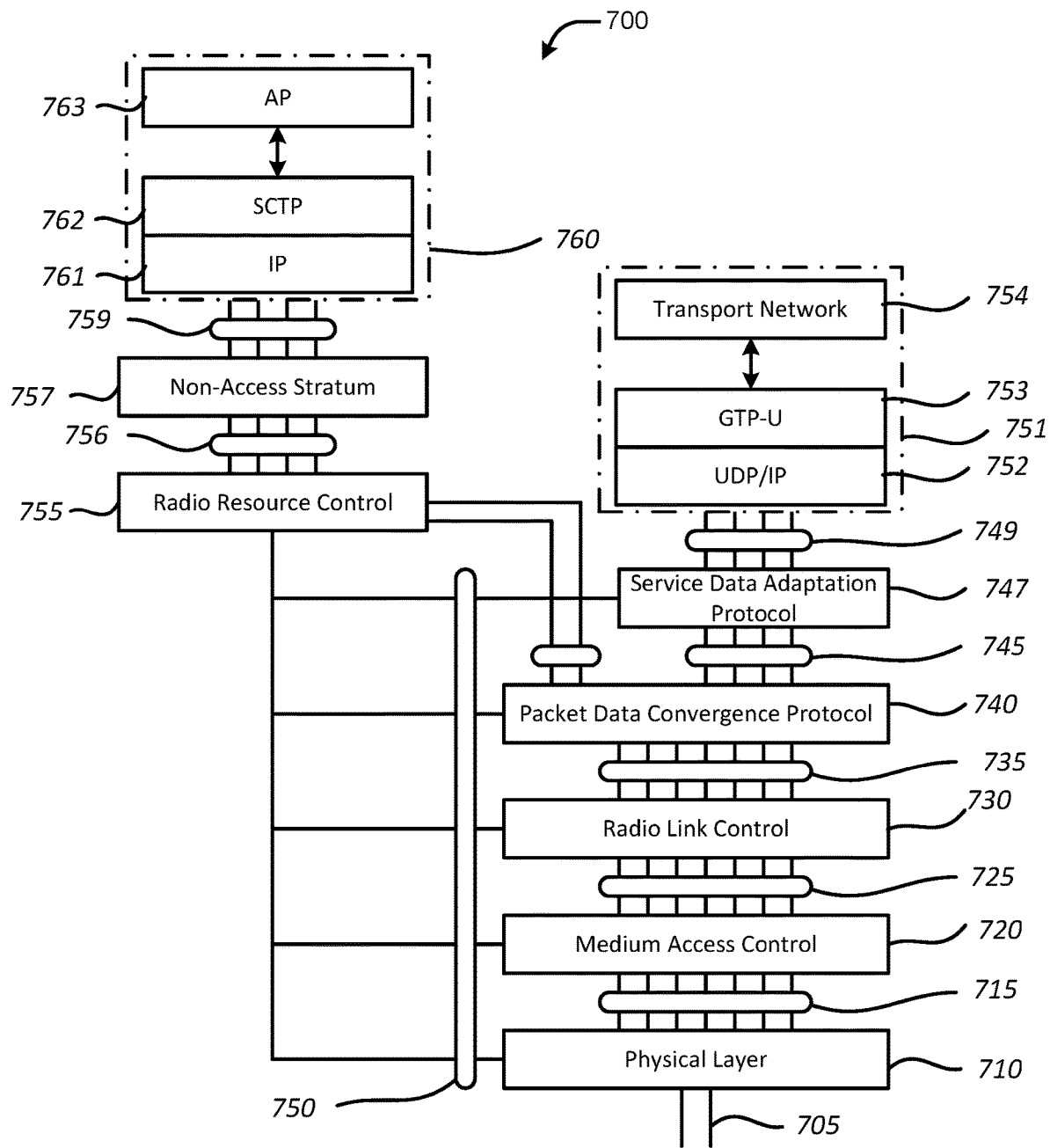
FIG. 7 illustrates various protocol functions that can be implemented in a wireless communication device according to one or more implementations.

FIG. 7 illustrates various protocol functions that can be implemented in a wireless communication device according to one or more implementations. In particular, FIG. 7 includes an arrangement 700 showing interconnections between various protocol layers/entities. The following description of FIG. 7 is provided for various protocol layers/entities that operate in conjunction with the 5G/NR system standards and LTE system standards, but some or all of the aspects of FIG. 7 can be applicable to other wireless communication network systems as well.

The protocol layers of arrangement 700 can include one or more of PHY 710, MAC 720, RLC 730, PDCP 740, SDAP 747, RRC 755, and NAS layer 757, in addition to other higher layer functions not illustrated. The protocol layers can include one or more service access points (e.g., items 759, 756, 750, 749, 745, 735, 725, and 715 in FIG. 7) that can provide communication between two or more protocol layers.

The PHY 710 can transmit and receive physical layer signals 705 that can be received from or transmitted to one or more other communication devices. The physical layer signals 705 can include one or more physical channels, such as those discussed herein. The PHY 710 can further perform link adaptation or adaptive modulation and coding (AMC), power control, cell search (e.g., for initial synchronization and handover purposes), and other measurements used by higher layers, such as the RRC 755. The PHY 710 can still further perform error detection on the transport channels, forward error correction (FEC) coding/decoding of the transport channels, modulation/demodulation of physical channels, interleaving, rate matching, mapping onto physical channels, and MIMO antenna processing. In implementations, an instance of PHY 710 can process requests from and provide indications to an instance of MAC 720 via one or more PHY-SAP 715. According to some implementations, requests and indications communicated via PHY-SAP 715 can include one or more transport channels.

Instance(s) of MAC 720 can process requests from, and provide indications to, an instance of RLC 730 via one or more MAC-SAPs 725. These requests and indications communicated via the MAC-SAP 725 can include one or more logical channels. The MAC 720 can perform mapping between the logical channels and transport channels, multiplexing of MAC SDUs from one or more logical channels onto TBs to be delivered to PHY 710 via the transport channels, de-multiplexing MAC SDUs to one or more logical channels from TBs delivered from the PHY 710 via transport channels, multiplexing MAC SDUs onto TBs, scheduling information reporting, error correction through HARQ, and logical channel prioritization.

Instance(s) of RLC 730 can process requests from and provide indications to an instance of PDCP 740 via one or more radio link control service access points (RLC-SAP) 735. These requests and indications communicated via RLC-SAP 735 can include one or more RLC channels. The RLC 730 can operate in multiple modes of operation, including: Transparent Mode™, Unacknowledged Mode (UM), and Acknowledged Mode (AM). The RLC 730 can execute transfer of upper layer protocol data units (PDUs), error correction through automatic repeat request (ARQ) for AM data transfers, and concatenation, segmentation and reassembly of RLC SDUs for UM and AM data transfers. The RLC 730 can also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 740 can process requests from and provide indications to instance(s) of RRC 755 and/or instance(s) of SDAP 747 via one or more packet data convergence protocol service access points (PDCP-SAP) 745. These requests and indications communicated via PDCP-SAP 745 can include one or more radio bearers. The PDCP 740 can execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 747 can process requests from and provide indications to one or more higher layer protocol entities via one or more SDAP-SAP 749. These requests and indications communicated via SDAP-SAP 749 can include one or more QoS flows. The SDAP 747 can map QoS flows to DRBs, and vice versa, and can also mark QFIs in DL and UL packets. A single SDAP entity 747 can be configured for an individual PDU session. In the UL direction, the NG-RAN 110 can control the mapping of QoS Flows to DRB(s) in two different ways, reflective mapping or explicit mapping. For reflective mapping, the SDAP 747 of a UE 101 can monitor the QFIs of the DL packets for each DRB, and can apply the same mapping for packets flowing in the UL direction. For a DRB, the SDAP 747 of the UE 101 can map the UL packets belonging to the QoS flows(s) corresponding to the QoS flow ID(s) and PDU session observed in the DL packets for that DRB. To enable reflective mapping, the NG-RAN 310 can mark DL packets over the Uu interface with a QoS flow ID. The explicit mapping can involve the RRC 755 configuring the SDAP 747 with an explicit QoS flow to DRB mapping rule, which can be stored and followed by the SDAP 747. In implementations, the SDAP 747 can only be used in NR implementations and is not used in LTE implementations.

The RRC 755 can configure, via one or more management service access points (M-SAP), aspects of one or more protocol layers, which can include one or more instances of PHY 710, MAC 720, RLC 730, PDCP 740 and SDAP 747. In implementations, an instance of RRC 755 can process requests from and provide indications to one or more NAS entities 757 via one or more RRC-SAPs 756. The main services and functions of the RRC 755 can include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs can include one or more IEs, which can each include individual data fields or data structures.

The NAS 757 can form the highest stratum of the control plane between the UE 101 and the AMF 321. The NAS 757 can support the mobility of the UEs 101 and the session management procedures to establish and maintain IP connectivity between the UE 101 and a P-GW in LTE systems.

According to various implementations, one or more protocol entities of arrangement 700 can be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such implementations, one or more protocol entities that can be implemented in one or more of UE 101, gNB 111, AMF 321, etc. Can communicate with a respective peer protocol entity that can be implemented in or on another device using the services of respective lower layer protocol entities to perform such communication. In some implementations, a gNB-CU of the gNB 111 can host the RRC 755, SDAP 747, and PDCP 740 of the gNB that controls the operation of one or more gNB-DUs, and the gNB-DUs of the gNB 111 can each host the RLC 730, MAC 720, and PHY 710 of the gNB 111.

In a first example, a control plane protocol stack can include, in order from highest layer to lowest layer, NAS 757, RRC 755, PDCP 740, RLC 730, MAC 720, and PHY 710. In this example, upper layers 760 can be built on top of the NAS 757, which includes an IP layer 761, an SCTP 762, and an application layer signaling protocol (AP) 763.

In NR implementations, the AP 763 can be an NG application protocol layer (NGAP or NG-AP) 763 for the NG interface 113 defined between the NG-RAN node 111 and the AMF 321, or the AP 763 can be an Xn application protocol layer (XnAP or Xn-AP) 763 for the Xn interface 112 that is defined between two or more RAN nodes 111.

The NG-AP 763 can support the functions of the NG interface 113 and can include Elementary Procedures (EPs). An NG-AP EP can be a unit of interaction between the NG-RAN node 111 and the AMF 321. The NG-AP 763 services can include two groups: UE-associated services (e.g., services related to a UE 101) and non-UE-associated services (e.g., services related to the whole NG interface instance between the NG-RAN node 111 and AMF 321). These services can include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 763 can support the functions of the Xn interface 112 and can include XnAP basic mobility procedures and XnAP global procedures. The XnAP basic mobility procedures can include procedures used to handle UE mobility within the NG RAN 111 (or E-UTRAN 210), such as handover preparation and cancellation procedures, SN Status Transfer procedures, UE context retrieval and UE context release procedures, RAN paging procedures, dual connectivity related procedures, and the like. The XnAP global procedures can include procedures that are not related to a specific UE 101, such as Xn interface setup and reset procedures, NG-RAN update procedures, cell activation procedures, and the like.

In LTE implementations, the AP 763 can be an S1 Application Protocol layer (S1-AP) 763 for the S1 interface 113 defined between an E-UTRAN node 111 and an MME, or the AP 763 can be an X2 application protocol layer (X2AP or X2-AP) 763 for the X2 interface 112 that is defined between two or more E-UTRAN nodes 111.

The S1 Application Protocol layer (S1-AP) 763 can support the functions of the S1 interface, and similar to the NG-AP discussed previously, the S1-AP can include S1-AP EPs. An S1-AP EP can be a unit of interaction between the E-UTRAN node 111 and an MME 221 within an LTE CN 120. The S1-AP 763 services can include two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 763 can support the functions of the X2 interface 112 and can include X2AP basic mobility procedures and X2AP global procedures. The X2AP basic mobility procedures can include procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures can include procedures that are not related to a specific UE 101, such as X2 interface setup and reset procedures, load indication procedures, error indication procedures, cell activation procedures, and the like.

The SCTP layer (alternatively referred to as the SCTP/IP layer) 762 can provide guaranteed delivery of application layer messages (e.g., NGAP or XnAP messages in NR implementations, or S1-AP or X2AP messages in LTE implementations). The SCTP 762 can ensure reliable delivery of signaling messages between the RAN node 111 and the AMF 321/MME 221 based, in part, on the IP protocol, supported by the IP 761. The Internet Protocol layer (IP) 761 can be used to perform packet addressing and routing functionality. In some implementations the IP layer 761 can use point-to-point transmission to deliver and convey PDUs. In this regard, the RAN node 111 can include L2 and L1 layer communication links (e.g., wired or wireless) with the MME/AMF to exchange information.

In a second example, a user plane protocol stack can include, in order from highest layer to lowest layer, SDAP 747, PDCP 740, RLC 730, MAC 720, and PHY 710. The user plane protocol stack can be used for communication between the UE 101, the RAN node 111, and UPF 302 in NR implementations or an S-GW 222 and P-GW 223 in LTE implementations. In this example, upper layers 751 can be built on top of the SDAP 747, and can include a user datagram protocol (UDP) and IP security layer (UDP/IP) 752, a General Packet Radio Service (GPRS) Tunneling Protocol for the user plane layer (GTP-U) 753, and a User Plane PDU layer (UP PDU) 763.

The transport network layer 754 (also referred to as a "transport layer") can be built on IP transport, and the GTP-U 753 can be used on top of the UDP/IP layer 752 (including a UDP layer and IP layer) to carry user plane PDUs (UP-PDUs). The IP layer (also referred to as the "Internet layer") can be used to perform packet addressing and routing functionality. The IP layer can assign IP addresses to user data packets in any of IPv4, IPv6, or PPP formats, for example.

The GTP-U 753 can be used for carrying user data within the GPRS core network and between the radio access network and the core network. The user data transported can be packets in any of IPv4, IPv6, or PPP formats, for example. The UDP/IP 752 can provide checksums for data integrity, port numbers for addressing different functions at the source and destination, and encryption and authentication on the selected data flows. The RAN node 111 and the S-GW 222 can utilize an S1-U interface to exchange user plane data via a protocol stack including an L1 layer (e.g., PHY 710), an L2 layer (e.g., MAC 720, RLC 730, PDCP 740, and/or SDAP 747), the UDP/IP layer 752, and the GTP-U 753. The S-GW 222 and the P-GW 223 can utilize an S5/S8a interface to exchange user plane data via a protocol stack including an L1 layer, an L2 layer, the UDP/IP layer 752, and the GTP-U 753. As discussed previously, NAS protocols can support the mobility of the UE 101 and the session management procedures to establish and maintain IP connectivity between the UE 101 and the P-GW 223.

Moreover, although not shown by FIG. 7, an application layer can be present above the AP 763 and/or the transport network layer 754. The application layer can be a layer in which a user of the UE 101, RAN node 111, or other network element interacts with software applications being executed, for example, by application circuitry 405 or application circuitry 505, respectively. The application layer can also provide one or more interfaces for software applications to interact with communications systems of the UE 101 or RAN node 111, such as the baseband circuitry 610. In some implementations the IP layer and/or the application layer can provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 8:
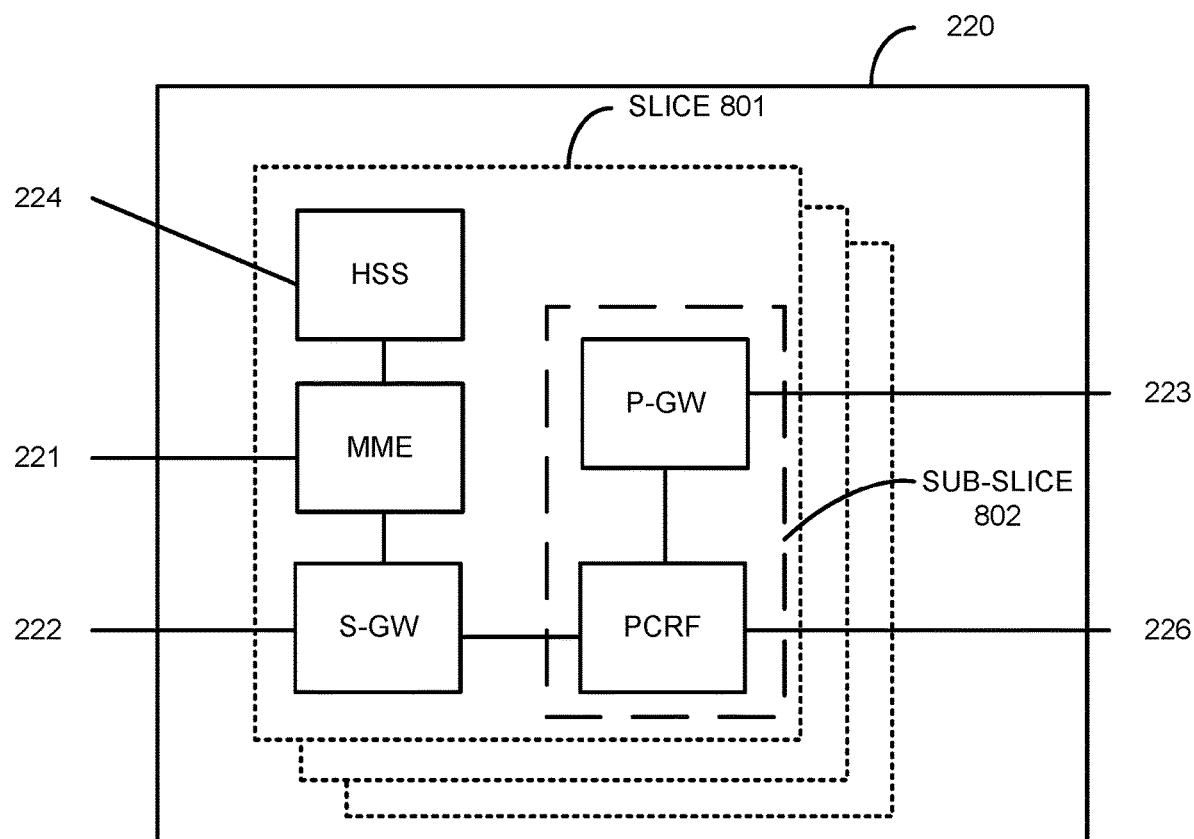
FIG. 8 illustrates components of a core network in accordance with one or more implementations.

FIG. 8 illustrates components of a core network in accordance with one or more implementations. The components of the CN 220 can be implemented in one physical node or separate physical nodes including components to read and execute instructions from a machine-readable or computer-readable medium (e.g., a non-transitory machine-readable storage medium). In implementations, the components of CN 320 can be implemented in a same or similar manner as discussed herein with regard to the components of CN 220. In some implementations, NFV is utilized to virtualize any or all of the above-described network node functions via executable instructions stored in one or more computer-readable storage mediums (described in further detail below). A logical instantiation of the CN 220 can be referred to as a network slice 801, and individual logical instantiations of the CN 220 can provide specific network capabilities and network characteristics. A logical instantiation of a portion of the CN 220 can be referred to as a network sub-slice 802 (e.g., the network sub-slice 802 is shown to include the P-GW 223 and the PCRF 226).

As used herein, the terms "instantiate," "instantiation," and the like can refer to the creation of an instance, and an "instance" can refer to a concrete occurrence of an object, which can occur, for example, during execution of program code. A network instance can refer to information identifying a domain, which can be used for traffic detection and routing in case of different IP domains or overlapping IP addresses. A network slice instance can refer to a set of network functions (NFs) instances and the resources (e.g., compute, storage, and networking resources) required to deploy the network slice.

With respect to 5G systems (see, e.g., FIG. 3), a network slice always includes a RAN part and a CN part. The support of network slicing relies on the principle that traffic for different slices is handled by different PDU sessions. The network can realize the different network slices by scheduling and also by providing different L1/L2 configurations. The UE 301 provides assistance information for network slice selection in an appropriate RRC message, if it has been provided by NAS. While the network can support large number of slices, the UE need not support more than 8 slices simultaneously.

A network slice can include the CN 320 control plane and user plane NFs, NG-RANs 310 in a serving PLMN, and a N3IWF functions in the serving PLMN. Individual network slices can have different S-NSSAI and/or can have different SSTs. NSSAI includes one or more S-NSSAIs, and each network slice is uniquely identified by an S-NSSAI. Network slices can differ for supported features and network functions optimizations, and/or multiple network slice instances can deliver the same service/features but for different groups of UEs 301 (e.g., enterprise users). For example, individual network slices can deliver different committed service(s) and/or can be dedicated to a particular customer or enterprise. In this example, each network slice can have different S-NSSAIs with the same SST but with different slice differentiators. Additionally, a single UE can be served with one or more network slice instances simultaneously via a 5G AN and associated with eight different S-NSSAIs. Moreover, an AMF 321 instance serving an individual UE 301 can belong to each of the network slice instances serving that UE.

Network Slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that include each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node can support multiple slices, and the NG-RAN 310 can also apply an appropriate RRM policy for the SLA in place to each supported slice. The NG-RAN 310 can also support QoS differentiation within a slice.

The NG-RAN 310 can also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which can be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation can be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices can be available only in part of the network. Awareness in the NG-RAN 310 of the slices supported in the cells of its neighbors can be beneficial for inter-frequency mobility in connected mode. The slice availability does not change within the UE's registration area. The NG-RAN 310 and the 5GC 320 are responsible to handle a service request for a slice that is or is not available in a given area. Admission or rejection of access to a slice can depend on factors such as support for the slice, availability of resources, support of the requested service by NG-RAN 310.

The UE 301 can be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can control the frequency on which the UE 301 camps. The 5GC 320 is to validate that the UE 301 has the rights to access a network slice. Prior to receiving an Initial Context Setup Request message, the NG-RAN 310 can be allowed to apply some provisional/local policies, based on awareness of a particular slice that the UE 301 is requesting to access. During the initial context setup, the NG-RAN 310 is informed of the slice for which resources are being requested.

NFV architectures and infrastructures can be used to virtualize one or more NFs, alternatively performed by proprietary hardware, onto physical resources including a combination of industry-standard server hardware, storage hardware, or switches. In other words, NFV systems can execute virtual or reconfigurable implementations of one or more EPC components/functions.

Figure 9:
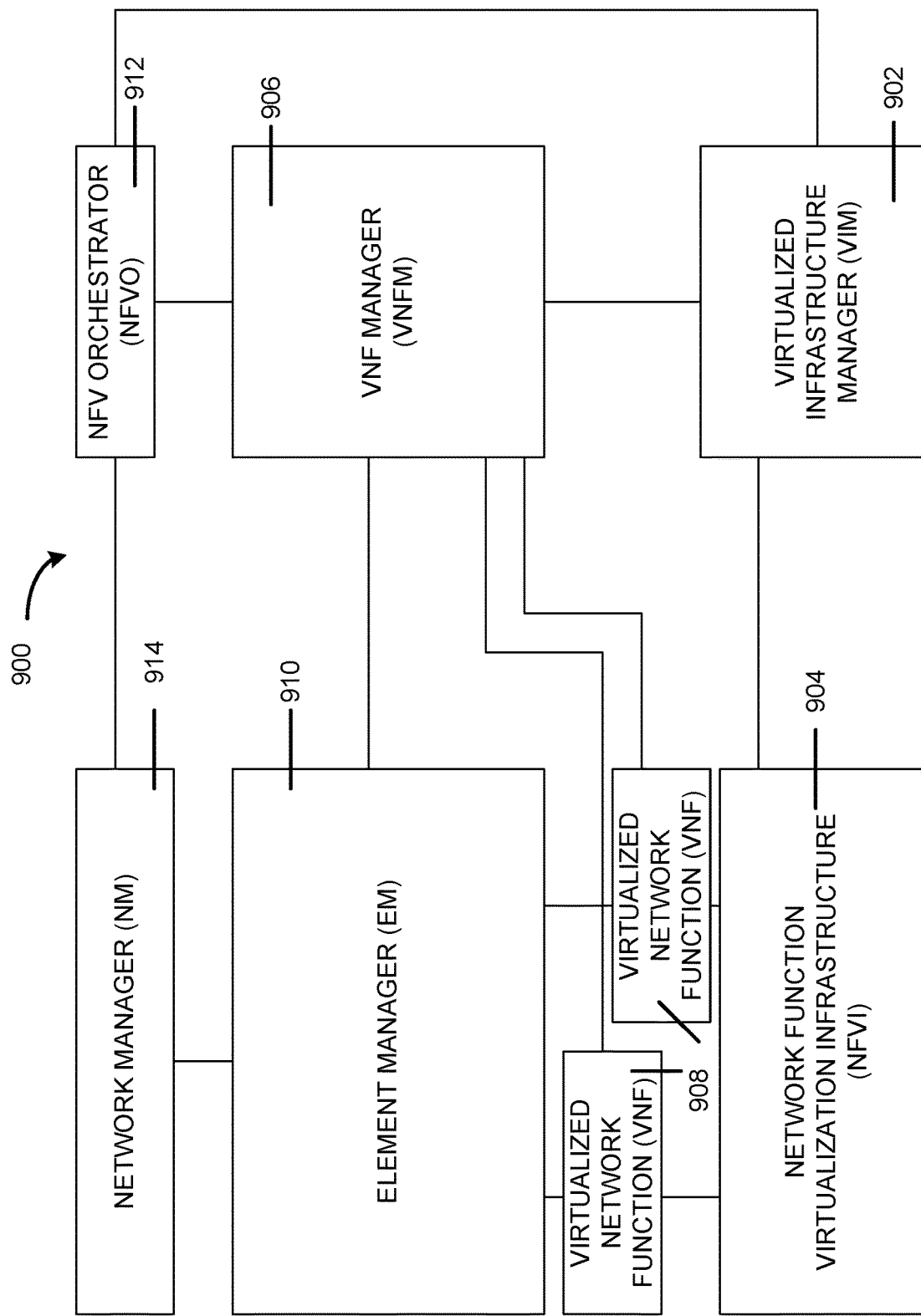
FIG. 9 is a block diagram illustrating components, according to some example implementations, of a system 900 to support Network Functions Virtualization (NFV).

FIG. 9 is a block diagram illustrating components, according to some example implementations, of a system 900 to support NFV. The system 900 is illustrated as including a VIM 902, an NFVI 904, an VNFM 906, VNFs 908, an EM 910, an NFVO 912, and a NM 914.

The VIM 902 manages the resources of the NFVI 904. The NFVI 904 can include physical or virtual resources and applications (including hypervisors) used to execute the system 900. The VIM 902 can manage the life cycle of virtual resources with the NFVI 904 (e.g., creation, maintenance, and tear down of VMs associated with one or more physical resources), track VM instances, track performance, fault and security of VM instances and associated physical resources, and expose VM instances and associated physical resources to other management systems.

The VNFM 906 can manage the VNFs 908. The VNFs 908 can be used to execute EPC components/functions. The VNFM 906 can manage the life cycle of the VNFs 908 and track performance, fault and security of the virtual aspects of VNFs 908. The EM 910 can track the performance, fault and security of the functional aspects of VNFs 908. The tracking data from the VNFM 906 and the EM 910 can include, for example, PM data used by the VIM 902 or the NFVI 904. Both the VNFM 906 and the EM 910 can scale up/down the quantity of VNFs of the system 900.

The NFVO 912 can coordinate, authorize, release and engage resources of the NFVI 904 in order to provide the requested service (e.g., to execute an EPC function, component, or slice). The NM 914 can provide a package of end-user functions with the responsibility for the management of a network, which can include network elements with VNFs, non-virtualized network functions, or both (management of the VNFs can occur via the EM 910).

Figure 10:
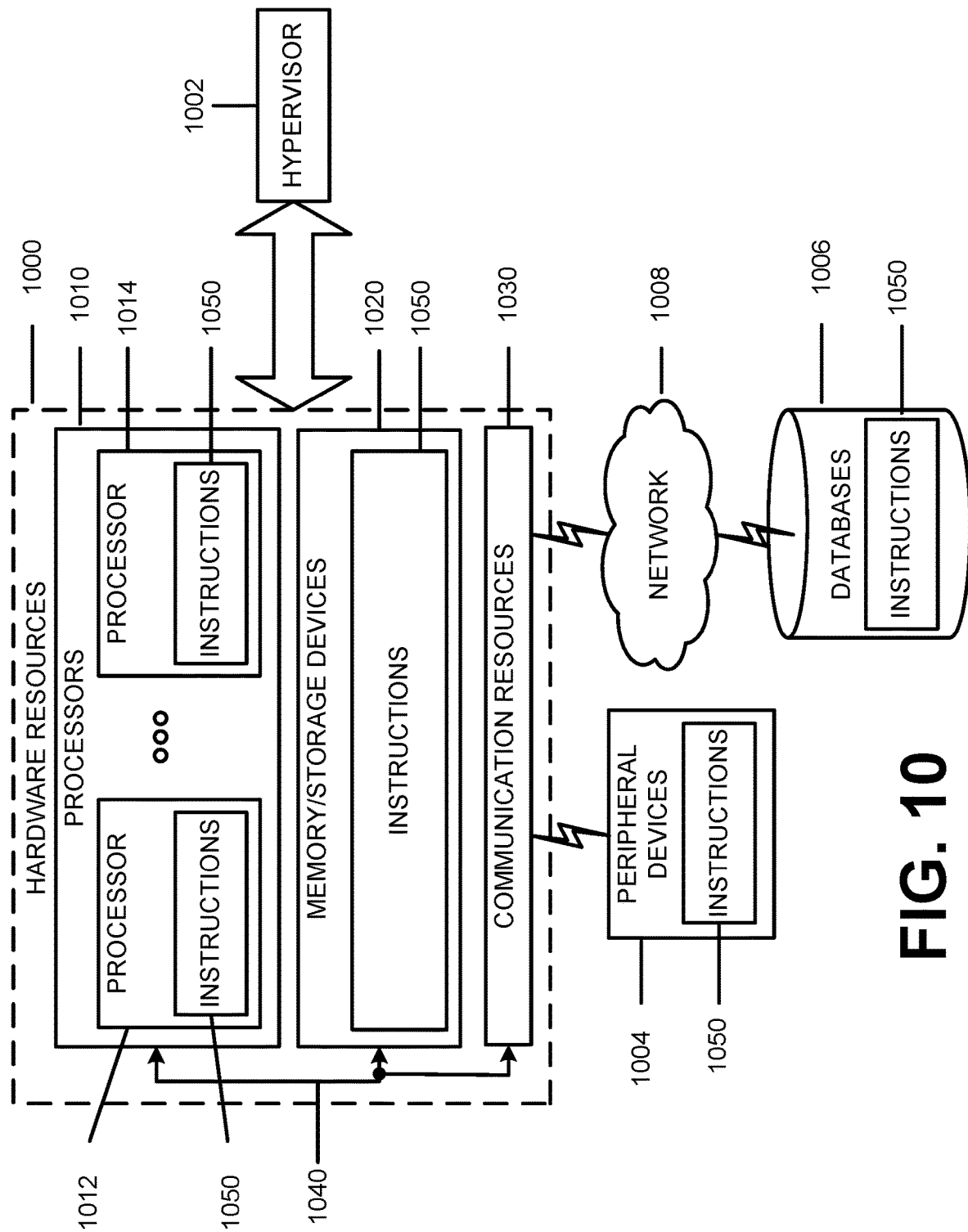
FIG. 10 is a block diagram illustrating components, according to some example implementations, able to read instructions from a machine-readable or computer-readable medium (e.g., a non-transitory machine-readable storage medium) and perform any one or more of the methodologies discussed herein.

FIG. 10 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which can be communicatively coupled via a bus 1040. For implementations where node virtualization (e.g., NFV) is utilized, a hypervisor 1002 can be executed to provide an execution environment for one or more network slices/sub-slices to utilize the hardware resources 1000.

The processors 1010 can include, for example, a processor 1012 and a processor 1014. The processor(s) 1010 can be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 can include main memory, disk storage, or any suitable combination thereof. The memory/storage devices 1020 can include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 can include interconnection or network interface components or other suitable devices to communicate with one or more peripheral devices 1004 or one or more databases 1006 via a network 1008. For example, the communication resources 1030 can include wired communication components (e.g., for coupling via USB), cellular communication components, NFC components, Bluetooth® (or Bluetooth® Low Energy) components, Wi-Fi® components, and other communication components.

Instructions 1050 can include software, a program, an application, an applet, an app, or other executable code for causing at least any of the processors 1010 to perform any one or more of the methodologies discussed herein. The instructions 1050 can reside, completely or partially, within at least one of the processors 1010 (e.g., within the processor's cache memory), the memory/storage devices 1020, or any suitable combination thereof. Furthermore, any portion of the instructions 1050 can be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Figure 11:
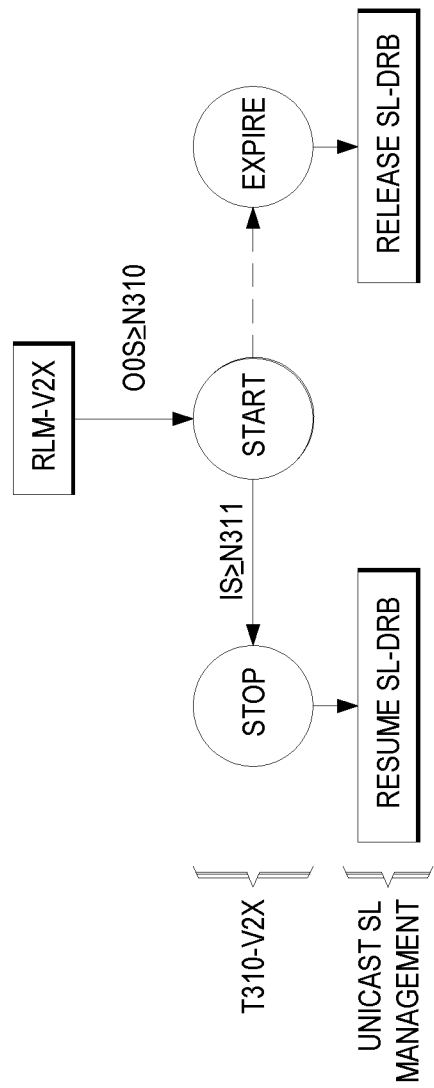
FIG. 11 is a block diagram illustrating an example of radio link monitoring (RLM)-based unicast sidelink (SL) management, according to one or more implementations.

FIG. 11 is a block diagram illustrating an example of radio link monitoring (RLM)-based unicast sidelink (SL) management, according to one or more implementations. The implementations disclosed herein provide methods for new radio (NR) SL communication, and RLM and radio link failure (RLF) declaration-based access stratum (AS)-level link management. In particular, the implementations enable SL radio resource management (RRM)-based AS-level link management and RLM reference signal (RS) design in accordance with 3GPP RAN 1. Further, in accordance with 3GPP RAN2, the air interface physical layer (Uu) RLM model is supported for SL RLM. For example, the AS-level link status (e.g., failure) is communicated to the upper layer by the implementations. In scenarios where SL radio link control (RLC) acknowledgement mode (AM) is supported for unicast, the triggering of RLF declarations by indication from the RLC that a maximum number of retransmissions has been reached is enabled.

In some implementations, RLM/RLF functions are enabled for unicast SL communications. Because generic RLM detection resources are supported, both transmitter (TX)-side and receiver (RX)-side RLM are enabled. In some implementations, a processor for a base station includes first circuitry configured to generate a radio resource control (RRC) message including an RRC information element indicating a number of unicast SL RLM reference signals. RLF detection criteria can be semi-statically configured using RRC signaling. In some implementations, the processor includes second circuitry configured to encode the RRC message for transmission to a user equipment (UE) 101. Unicast SL radio bearer/link connections can be released, resumed, or recovered using timer operations. As a result, RLM/RLF and associated unicast SL management is supported by the implementations in a resource efficient manner.

In some implementations, configurable RLM resources and RLF metrics are used. For example, the resources used for RLM as well as the RLF metrics can be configured by the network using RRC signaling when the UE 101 is in a coverage range of a cellular network (e.g., mode-1). In such implementations, the resources used for RLM as well as the RLF metrics can be preconfigured using default parameters when the UE 101 is out of coverage of the network, (e.g., mode-2). In particular, the RRC information element (IE) "RadioLinkMonitoringV2Xconfig" can be used to realize the configuration and RadioLinkMonitoringV2XConfig IE can be included in the UE 101's SL-specific RRC configuration IE. Such implementations can be enabled as follows:

```
RadioLinkMonitoringV2XConfig ::=  SEQUENCE {
    failureDetectionResourcesToAddModList
        SEQUENCE (SIZE(1..maxNrofFailureDetectionResourcesV2X)) OF
            RadioLinkMonitoringResourceV2X OPTIONAL, -- Need N
    failureDetectionResourcesToReleaseList
        SEQUENCE (SIZE(1..maxNrofFailureDetectionResourcesV2X)) OF
            RadioLinkMonitoringRSV2X-Id }
```

In the example above, the parameter maxNrofFailureDetectionResourcesV2X defines a bound on a number of unicast SL RLM RS can be configured. If only one RLM-Resource is configured per unicast SL, this parameter determines a bound on a number of unicast SLs to be configured using the RLM function. The IE RadioLinkMonitoringResourceV2X can be configured as follows:

```
RadioLinkMonitoringResourceV2X ::=      SEQUENCE {
    radioLinkMonitoringResource-Id          RadioLinkMonitoringResourceV2X-Id,
    detectionResource                       CHOICE {
        csi-RS-V2X-Index                    NZP-CSI-RS-V2X-ResourceId,
        DMRS
        RLC-NACK
        HARQ-NACK },
    rlf-TimersAndConstantsV2X
        SetupRelease { RLF-TimersAndConstantsV2X } OPTIONAL, -- Need M
    rlmInSyncOutOfSyncThreshold             ENUMERATED {n1} OPTIONAL, -- Need S
    ... }
```

In the example above, the radioLinkMonitoringResourceId parameter defines the ID of the unicast SL RLM-resource. In some implementations, the RRC information element further indicates a type of the RLM resource. For example, the detectionResource parameter defines the type of RLM resources. In some implementations, the generated reference signal is a channel state information-reference signal (CSI-RS) or a demodulation reference signal (DMRS). In particular, the channel state information-reference signal (CSI-RS) and the demodulation reference signal (DMRS) can be configured for RLF detection at the RX side. RLC-NACK and HARQ-NACK, defining the RLC failure and PHY HACK-NACK, respectively, can be configured for RLF detection at the TX side. In some implementations, the RRC information element further indicates a timer and a constant for at least one of a radio link failure (RLF) detection procedure or a unicast SL connection procedure. For example, the configuration of rfl-TimersAndConstantsV2X defines the timers and constants used for RLF detection and unicast SL connection procedures. In some implementations, the RRC information element further indicates an IS/OOS threshold configuration based on the IS threshold and the OOS threshold for the RLM resource. For example, the rlmInSyncOutOfSyncThreshold parameter defines the IS/OOS threshold configurations. In some implementations, a processor for a base station includes third circuitry configured to generate a reference signal indicating an in-sync (IS) threshold and an out-of-sync (OOS) threshold for an RLM resource. Different thresholds can be enabled for IS/OOS switching and the associated SL procedure operations. In some implementations, the processor includes fourth circuitry configured to encode the reference signal for transmission to the UE 101. The processor includes fifth circuitry configured to transmit the RRC message and the reference signal to the UE 101.

In some implementations, in-synch (IS)/out-of-sync (OOS) determination is performed using the RLM resources. For example, an IS/OOS status is determined based on the configured RLM resource, i.e., detectionResource using RadioLinkMonitoringResourceV2X. In particular, when a reference signal (RS), such as CSI-RS or DMRS, is configured as the RLM resource, an estimated block error rate (BLER) can be used for IS/OOS determination. For other RLM resources, e.g., radio link control negative acknowledgement (RLC-NACK) or hybrid automatic repeat request NACK (HARQ-NACK), the thresholds of IS and OOS can be semi-statically configured using RLF-TimersAndConstantsV2X as follows:

```
RLF-TimersAndConstantsV2X::=  SEQUENCE {
    t310-V2X   ENUMERATED {ms0, ms50, ms100, ms200, ms500, ms1000, ms2000,
ms4000, ms6000},
    n310       ENUMERATED {n1, n2, n3, n4, n6, n8, n10, n20},
    n311       ENUMERATED {n1, n2, n3, n4, n5, n6, n8, n10},
    t311-V2X   ENUMERATED {ms1000, ms3000, ms5000, ms1000, ms15000,
ms20000, ms30000}
    nIS        ENUMERATED {n1, n2, n3, n4, n6, n8, n10 } OPTIONAL,
    nOOS ENUMERATED {n1, n2, n3, n4, n5, n6, n8, n10, n20} OPTIONAL,
    ... }
```

In some implementations, the reference signal further indicates a number of consecutive reception events for an IS determination. In the example above, the nIS parameter defines a number of consecutive reception events for determining the IS state. In particular, if detectionResource is set to RLC-NACK (HARQ-NACK), the nIS parameter indicates a number of consecutive RLC-ACK (HARQ-ACK) for being in the IS state. In some implementations, the reference signal further indicates a number of consecutive erroneous reception events required for an OOS determination. The nOOS parameter defines a number of consecutive erroneous reception events for determining the OOS state. In particular, if detectionResource is set to RLC-NACK (HARQ-NACK), nOOS indicates the number of consecutive RLC-NACK (HARQ-NACK) for being in the OOS state. The n3xy parameter is defined in TS 38.331. T3xy-V2X are timers defined to control RLC processes, as illustrated and described below with reference to FIGS. 11 and 12.

In some implementations, a radio bearer (RB)-specific RLM configuration is used. In such implementations, the unicast SL RLM configuration (RadioLinkMonitoringV2Xconfig) is configured in an RB-specific manner, such that RLM-related functions can be performed at the RB-level. In particular, RadioLinkMonitoringV2XConfig can be configured using RLC-BearerV2XConfig as follows:

```
RLC-BearerV2XConfig ::=           SEQUENCE {
    logicalChannelIdentity       LogicalChannelIdentity,
    servedRadioBearer            CHOICE {
    srb-Identity                 SRB-Identity,
    drb-Identity                 DRB-Identity
    }  OPTIONAL, -- Cond LCH-SetupOnly
    reestablishRLC               ENUMERATED {true} OPTIONAL, -- Need N
    rlc-Config                   RLC-Config OPTIONAL, -- Cond LCH-Setup
    mac-LogicalChannelConfig LogicalChannelConfig OPTIONAL, -- Cond LCH-Setup
    rlmV2XConfig                 RadioLinkMonitoringV2Xconfig
    ... }
```

Depending on how the RLF timers are configured, at least two different implementations can be realized for RLM-assisted unicast SL management. Referring to FIG. 11, the first implementation is based on single-timer unicast SL management. In this implementation, the T310-V2X timer is configured in accordance with RLF-TimersAndConstantsV2X to determine if an RB can be released or resumed when RLF is detected for an associated radio link. As illustrated in FIG. 11, when a number of consecutive OOS states detected using the RLM function exceeds the constant N310, the timer T310-V2X can be started. Meanwhile, the RLM monitors the radio link quality. If a number of consecutive IS events exceeds the constant N311, the timer T310-V2X can be stopped and the RB associated with the RLM function can be consequently resumed. Else, the timer T310-V2X will run until expiring. Upon the expiration of the T310-V2X timer, the RB can be released by the UE 101. The second implementation of RLM-assisted unicast SL management is illustrated and described below in more detail with reference to FIG. 12.

Figure 12:
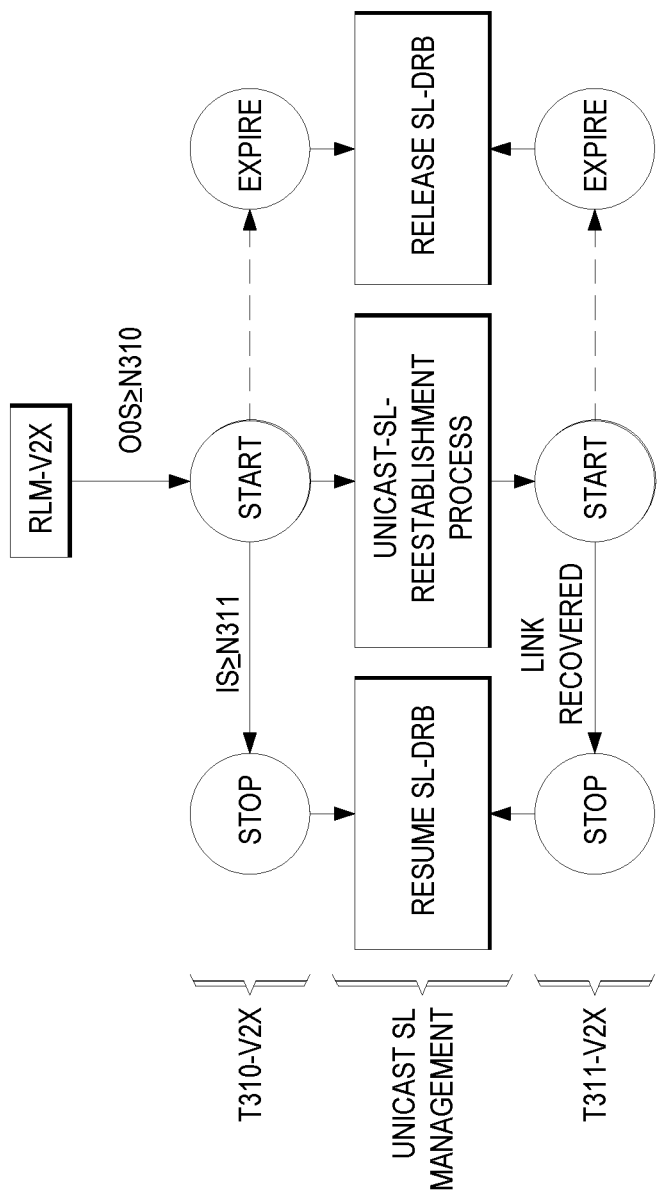
FIG. 12 is a block diagram illustrating an example of RLM-based unicast SL management with SL recovery, according to one or more implementations.

FIG. 12 is a block diagram illustrating an example of RLM-based unicast SL management with SL recovery, according to one or more implementations. The second implementation of RLM-assisted unicast SL management, as illustrated in FIG. 12, is based on unicast SL management using radio link re-establishment. In this implementation, both timers T310-V2X and T311-V2X are configured in accordance with RLF-TimersAndConstantsV2X to control the unicast SL management. In particular, timer T310-V2X controls the release or resumption of the RB link while timer T311-V2X controls the recovery of the RB radio. In this manner, both the timers T310-V2X and T311-V2X are configured using RLF-TimersAndConstantsV2X to control the RLM, i.e., the manner in which an RB can be released, resumed, or recovered when RLF is detected for the radio link. Hence, the timer T310-V2X controls the release or resumption of the RB link while the timer T311-V2X controls the recovery of the RB radio.

As illustrated in FIG. 12, the two timers can be operated as in the following description. For the timer T310-V2X, when a number of consecutive OOS states detected by the RLM function exceeds the constant N310, the timer T310-V2X can be started. Meanwhile, RLM is used to monitor the radio link quality. If a number of consecutive IS events exceeds the constant N311, the timer T310-V2X can be stopped and the associated RB can be resumed. Else, the timer T310-V2X will run until expiry. Upon the expiration of T310-V2X, the RB can be released by the UE 101. For the timer T311-V2X, upon the commencement of the timer T310-V2X, the unicast radio link reestablishment process can be begun, which triggers the unicast SL discovery procedure. Upon the commencement of the unicast SL discovery procedure, the timer T311-V2X can be started. If a higher quality unicast SL link is recovered, e.g., using a new beam, the timer T311-V2X can be stopped. If the timer T311-V2X is stopped, the SL RB link can be resumed. Else, the timer T311-V2X will run until expiring. Upon the expiration of T311-V2X, the RB can be released by the UE 101.

In some implementations, an RRC message is generated that includes an RRC information element having a parameter that defines a bound on a number of unicast SL RLM reference signals that can be configured. In such implementations, a base station, such as a gNB 111 or an eNB, encode the RRC message for transmission to a UE 101. In other implementations, the base station generates am RS including an indication of an IS threshold and an OOS threshold for an RLM resource. In such implementations, the base station further encodes the RS for transmission to the UE 101. The implementations disclosed herein enable RLM/RLF functions for unicast SL communications. Moreover, using generic RLM detection resources, both TX-side and RX-side RLM are supported, and RLF detection criteria can be semi-statically configured using RRC signaling. The unicast SL RB link connection can be released, resumed, or recovered using timer operations. As a result, RLM/RLF and associated unicast SL management is supported in a resource efficient manner.

FIG. 13 is a flowchart illustrating a process for RLM monitoring for unicast SL communications. In some implementations, the process of FIG. 13 is performed by a processor for a base station (e.g., an eNB or a gNB 111).

The processor generates (1304) a radio resource control (RRC) message including an RRC information element indicating a number of unicast sidelink (SL) radio link monitoring (RLM) reference signals. RLF detection criteria can be semi-statically configured using RRC signaling.

The processor encodes (1308) the RRC message for transmission to the user equipment (UE) 101. Unicast SL radio bearer/link connections can be released, resumed, or recovered using timer operations. As a result, RLM/RLF and associated unicast SL management is supported by the implementations in a resource efficient manner.

The processor generates (1312) a reference signal indicating an in-sync (IS) threshold and an out-of-sync (OOS) threshold for an RLM resource. Different thresholds can be enabled for IS/OOS switching and the associated SL procedure operations.

The processor encodes (1316) the reference signal for transmission to the UE 101. For example, an IS/OOS status is determined based on the configured RLM resource, i.e., detectionResource using RadioLinkMonitoringResourceV2X. In particular, when a reference signal (RS), such as CSI-RS or DMRS, is configured as the RLM resource, an estimated block error rate (BLER) can be used for IS/OOS determination. The processor transmits (1320) the RRC message and the reference signal to the UE 101.

For one or more implementations, at least one of the components set forth in one or more of the preceding figures can be configured to perform one or more operations, techniques, processes, and/or methods as set forth in the example section below. For example, the baseband circuitry as described above in connection with one or more of the preceding figures can be configured to operate in accordance with one or more of the examples set forth below. For another example, circuitry associated with a UE, base station, network element, etc. as described above in connection with one or more of the preceding figures can be configured to operate in accordance with one or more of the examples set forth below.

Example 1 can include a method in which the resources used for RLM as well as the RLF metric can be configured by the network using RRC signaling when a UE is in a coverage region of the cellular network, i.e., mode-1. The resources used for RLM as well as the RLF metric can be preconfigured using default parameters when the UE is out of coverage of the network, i.e., mode-2.

Example 2 can include the method of Example 1 or some other example herein, wherein the RRC information element (IE) "RadioLinkMonitoringV2XConfig" can be used to realize the configuration. The RadioLinkMonitoringV2XConfig IE configuration can be included in the UE SL-specific RRC configuration IE as follows:

```
RadioLinkMonitoringV2XConfig ::=   SEQUENCE {
    failureDetectionResourcesToAddModList
        SEQUENCE (SIZE(1..maxNrofFailureDetectionResourcesV2X)) OF
            RadioLinkMonitoringResourceV2X OPTIONAL, -- Need N
    failureDetectionResourcesToReleaseList
        SEQUENCE (SIZE(1..maxNrofFailureDetectionResourcesV2X)) OF
            RadioLinkMonitoringRSV2X-Id }
```

Example 3 can include the parameter maxNrofFailureDetectionResourcesV2X of Example 2 or some other example herein, wherein a bound on a number of unicast SL RLM reference signals can be configured. If only one RLM-Resource is configured per unicast SL, this parameter determines a bound on a number of unicast SLs to be configured using the RLM function.

Example 4 can include the parameter IE RadioLinkMonitoringResourceV2X of Example 2 or some other example herein, wherein the parameter can be designed as follows:

be used for IS/OOS switching and associated SL procedure operations.

Example 9 can include a method where the IS/OOS state is determined based on the configured RLM resource, i.e., the detectionResource parameter in the RadioLinkMonitoringResourceV2X configuration.

Example 10 can include the method of Example 9 or some other example herein, wherein when the RS, such as CSI-RS or DMRS, is configured as part of the RLM resources, the

```
RadioLinkMonitoringResourceV2X ::=     SEQUENCE {
    radioLinkMonitoringResource-Id        RadioLinkMonitoringResourceV2X-Id,
    detectionResource              CHOICE {
        csi-RS-V2X-Index           NZP-CSI-RS-V2X-ResourceId,
        DMRS
        RLC-NACK
        HARQ-NACK },
    rlf-TimersAndConstantsV2X
        SetupRelease { RLF-TimersAndConstantsV2X } OPTIONAL, -- Need M
    rlmInSyncOutOfSyncThreshold           ENUMERATED {n1} OPTIONAL, -- Need S
    ... }
```

Example 5 can include the parameter radioLinkMonitoringResource-Id of Example 4 or some other example herein, wherein the parameter defines the ID of unicast SL RLM-resources.

Example 6 can include the detectionResource parameter of Example 4 to define a type of RLM resources used. In particular, CSI-RS and DMRS can be configured for RLF detection on the RX side. RLC-NACK and HARQ-NACK, defining the RLC failure and the physical layer (PHY) hybrid acknowledgment (HACK)-NACK respectively, can be configured for RLF detection at the TX side.

Example 7 can include the rfl-TimersAndConstantsV2X parameter of Example 4 or some other example herein, wherein the parameter defines the timers and constants for RLF detection and the unicast SL connection procedures.

Example 8 can include the rlmInSyncOutOfSyncThreshold parameter of Example 4 or some other example herein, wherein the parameter defines the IS/OOS threshold configurations. This parameter allows the different thresholds to estimated BLER can be used for IS/OOS state determination.

Example 11 can include the method of Example 9 or some other example herein, wherein for other types of RLM resources, e.g., RLC-NACK or HARQ-NACK, the thresholds of IS and OOS can be semi-statically configured using RLF-TimersAndConstantsV2X as follows:

```
RLF-TimersAndConstantsV2X::=   SEQUENCE {
    t310-V2X   ENUMERATED {ms0, ms50, ms100, ms200, ms500, ms1000, ms2000,
ms4000, ms6000},
    n310       ENUMERATED {n1, n2, n3, n4, n6, n8, n10, n20},
    n311       ENUMERATED {n1, n2, n3, n4, n5, n6, n8, n10},
    t311-V2X   ENUMERATED {ms1000, ms3000, ms5000, ms10000, ms15000,
ms20000, ms30000}
    nIS        ENUMERATED {n1, n2, n3, n4, n6, n8, n10 } OPTIONAL,
    nOOS       ENUMERATED {n1, n2, n3, n4, n5, n6, n8, n10, n20} OPTIONAL,
    ... }
```

Example 12 can include the nIS parameter of Example 11 or some other example herein, wherein the parameter defines a number of consecutive successful reception events for the determination of the IS state. In particular, if detectionResource is set to RLC-NACK (HARQ-NACK), nIS indicates the number of consecutive RLC-ACK (HARQ-ACK) for being in the IS state.

Example 13 can include the nOOS parameter of Example 11 or some other example herein, wherein the parameter defines the number of consecutive erroneous reception events for the determination of the OOS state. In particular, if detectionResource is set to RLC-NACK (HARQ-NACK), nOOS indicates the number of consecutive RLC-NACK (HARQ-NACK) for being in the OOS state.

Example 14 can include the n3xy parameter as defined in TS 38.331. T3xy-V2X are timers defined to control various RLC processes.

Example 15 can include the unicast SL RLM configuration parameter RadioLinkMonitoringV2XConfig of Example 1. This is configured in an RB-specific manner, such that RLM-related functions can be performed at the RB level. In particular, the RadioLinkMonitoringV2XConfig parameter can be configured using RLC-BearerV2XConfig as follows:

```
RLC-BearerV2XConfig ::=         SEQUENCE{
    logicalChannelIdentity      LogicalChannelIdentity,
    servedRadioBearer           CHOICE {
       srb-Identity             SRB-Identity,
       drb-Identity             DRB-Identity
    } OPTIONAL, -- Cond LCH-SetupOnly
    reestablishRLC              ENUMERATED {true} OPTIONAL, -- Need N
    rlc-Config                  RLC-Config OPTIONAL, -- Cond LCH-Setup
    mac-LogicalChannelConfig LogicalChannelConfig OPTIONAL, -- Cond LCH-Setup
    rlmV2XConfig                RadioLinkMonitoringV2Xconfig
    ... }
```

Example 16 can include the timer T310-V2X of Example 11 or some other example herein, wherein the timer is configured using RLF-TimersAndConstantsV2X to determine whether an RB can be released or resumed when RLF is detected for the associated radio link.

Example 17 can include the parameters illustrated in FIG. 11. When a number of consecutive OOS states detected by the RLM function exceeds the constant N310, the timer T310-V2X can be started.

Example 18 can include monitoring of the radio link quality using RLM. If the number of consecutive IS events exceeds the constant N311, the timer T310-V2X can be stopped. The RB associated with the RLM function can be consequently resumed.

Example 19 can include the timer T310-V2X running until expiry. Upon the expiration of the timer T310-V2X, the RB can be released by the UE.

Example 20 can include both timers T310-V2X and T311-V2X of Example 11 or some other example herein, wherein the timers are configured using RLF-TimersAndConstantsV2X to control the radio link management, e.g., the manner in which an RB can be released, resumed, or recovered when RLF is detected for the radio link.

Example 22 can include the timer T310-V2X controlling the release or resumption of the RB link while the timer T311-V2X controls the recovery of the RB radio.

Example 23 can include the parameters as illustrated in FIG. 12. The two timers can operate as follows. For the timer T310-V2X, when a number of consecutive OOS states detected by the RLM function exceeds the constant N310, the timer T310-V2X can be started. Meanwhile, the RLM monitors the radio link quality. If the number of consecutive IS events exceeds the constant N311, the timer T310-V2X can be stopped, and the associated RB can be consequently resumed. Else, the timer T310-V2X will run until expiring. Upon the expiration of the timer T310-V2X, the RB can be released by the UE. For the timer T311-V2X, upon commencement of the timer T310-V2X, the unicast radio link re-establishment process can be started. This process triggers the unicast SL discovery procedure. Upon the start of the unicast SL discovery procedure, the timer T311-V2X can be started. If a better unicast SL link is recovered, e.g., through a new beam, the timer T311-V2X can be stopped. If the timer T311-V2X is stopped, the SL RB link can be resumed. Else, the timer T311-V2X will run until expiring. Upon the expiration of the timer T311-V2X, the RB can be released by the UE.

Example 24 includes a method including generating a radio resource control (RRC) message that includes an RRC information element having a parameter defining a bound on a number of unicast SL RLM reference signals that can be configured. The RRC message is encoded for transmission to a UE.

Example 25 includes the method of Example 24 or some other example herein, wherein the RRC information element further indicates an identifier of a unicast SL RLM resource.

Example 26 includes the method of Example 24 or some other example herein, wherein the RRC information element further indicates a type of a RLM resource.

Example 27 includes the method of Example 24 or some other example herein, wherein the RRC information element further indicates a timer and a constant for a radio link failure (RLF) detection procedure or a unicast SL connection procedure.

Example 28 includes the method of Example 24 or some other example herein, wherein the RRC information element further indicates an IS/OOS threshold configuration.

Example 29 includes a method including generating a reference signal including an indication of an IS threshold and an OOS threshold for an RLM resource. The RS is encoded for transmission to a UE.

Example 30 includes the method of Example 29 or some other example herein, wherein the reference signal is a channel state information-reference signal (CSI-RS) or a demodulation reference signal (DMRS).

Example 31 includes the method of Example 29 or some other example herein, wherein the reference signal further indicates a number of consecutive successful reception events for an IS determination.

Example 32 includes the method of example 29 or some other example herein, wherein the reference signal further indicates a number of consecutive erroneous reception events required for an OOS determination.

Example 33 includes the method of any one of Examples 24-32, wherein the method is performed by a next-generation NodeB (gNB) or portion thereof.

Example 34 includes an apparatus including means to perform one or more elements of a method described in or related to any of Examples 1-33, or any other method or process described herein.

Example 35 can include one or more non-transitory computer-readable media including instructions to cause an electronic device, upon execution of the instructions by one or more processors of the electronic device, to perform one or more elements of a method described in or related to any of Examples 1-33, or any other method or process described herein.

Example 36 can include an apparatus including logic, modules, or circuitry to perform one or more elements of a method described in or related to any of Examples 1-33, or any other method or process described herein.

Example 37 can include a method, technique, or process as described in or related to any of Examples 1-33, or portions or parts thereof.

Example 38 can include an apparatus including: one or more processors and one or more computer-readable media including instructions that, when executed by the one or more processors, cause the one or more processors to perform the method, techniques, or process as described in or related to any of Examples 1-33, or portions thereof.

Example 39 can include a signal as described in or related to any of Examples 1-33, or portions or parts thereof.

Example 40 can include a datagram, packet, frame, segment, protocol data unit (PDU), or message as described in or related to any of Examples 1-33, or portions or parts thereof, or otherwise described in the present disclosure.

Example 41 can include a signal encoded with data as described in or related to any of Examples 1-33, or portions or parts thereof, or otherwise described in the present disclosure.

Example 42 can include a signal encoded with a datagram, packet, frame, segment, protocol data unit (PDU), or message as described in or related to any of Examples 1-33, or portions or parts thereof, or otherwise described in the present disclosure.

Example 43 can include an electromagnetic signal carrying computer-readable instructions, wherein execution of the computer-readable instructions by one or more processors is to cause the one or more processors to perform the method, techniques, or process as described in or related to any of Examples 1-33, or portions thereof Example 44 can include a computer program including instructions, wherein execution of the program by a processing element is to cause the processing element to carry out the method, techniques, or process as described in or related to any of Examples 1-33, or portions thereof Example 45 can include a signal in a wireless network as shown and described herein.

Example 46 can include a method of communicating in a wireless network as shown and described herein.

Example 47 can include a system for providing wireless communication as shown and described herein.

Example 48 can include a device for providing wireless communication as shown and described herein.

Any of the above-described examples can be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or can be acquired from practice of various embodiments.

The following is a glossary of terms used in this disclosure.

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium can include other types of non-transitory memory as well or combinations thereof. In addition, the memory medium can be located in a first computer system in which the programs are executed, or can be located in a second different computer system which connects to the first computer system over a network, such as the Internet. In the latter instance, the second computer system can provide program instructions to the first computer for execution. The term "memory medium" can include two or more memory mediums which can reside in different locations, e.g., in different computer systems that are connected over a network. The memory medium can store program instructions (e.g., implemented as computer programs) that can be executed by one or more processors.

Carrier Medium—A memory medium as described above, as well as a physical transmission medium, such as a bus, network, and/or other physical transmission medium that conveys signals such as electrical, electromagnetic, or digital signals.

Programmable Hardware Element—Includes various hardware devices including multiple programmable function blocks connected via a programmable interconnect. Examples include Field Programmable Gate Arrays (FPGAs), Programmable Logic Devices (PLDs), Field Programmable Object Arrays (FPOAs), and Complex PLDs (CPLDs). The programmable function blocks can range from fine grained (combinatorial logic or look up tables) to coarse grained (arithmetic logic units or processor cores). A programmable hardware element can also be referred to as "reconfigurable logic".

Computer System—Any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium. The term "computer system" can further refer to any type interconnected electronic devices, computer devices, or components thereof. Additionally, the term "computer system" and/or "system" can refer to various components of a computer that are communicatively coupled with one another. Furthermore, the term "computer system" and/or "system" can refer to multiple computer devices and/or multiple computing systems that are communicatively coupled with one another and configured to share computing and/or networking resources.

User Equipment (UE) (or "UE Device")—Any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. The term "user equipment" or "UE" can further refer to a device with radio communication capabilities and can describe a remote user of network resources in a communications network. The term "user equipment" or "UE" can be considered synonymous to, and can be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" can include any type of wireless/wired device or any computing device including a wireless communications interface.

Base Station—The term "Base Station" has the full breadth of its ordinary meaning, and at least includes a wireless communication station installed at a fixed location and used to communicate as part of a wireless telephone system or radio system.

Processing Element—The term refers to various elements or combinations of elements that are capable of performing a function in a device, such as a user equipment or a cellular network device. Processing elements can include, for example: processors and associated memory, portions or circuits of individual processor cores, entire processor cores, processor arrays, circuits such as an Application Specific Integrated Circuit (ASIC), programmable hardware elements such as a field programmable gate array (FPGA), as well any of various combinations of the above.

Channel—A medium used to convey information from a sender (transmitter) to a receiver. It should be noted that since characteristics of the term "channel" can differ according to different wireless protocols, the term "channel" as used herein can be considered as being used in a manner that is consistent with the standard of the type of device with reference to which the term is used. In some standards, channel widths can be variable (e.g., depending on device capability, band conditions, etc.). For example, LTE can support scalable channel bandwidths from 1.4 MHz to 20 MHz. In contrast, WLAN channels can be 22 MHz wide while Bluetooth channels can be 1 MHz wide. Other protocols and standards can include different definitions of channels. Furthermore, some standards can define and use multiple types of channels, e.g., different channels for uplink or downlink and/or different channels for different uses such as data, control information, etc. The term "channel" can further refer to any transmission medium, either tangible or intangible, which is used to communicate data or a data stream. The term "channel" can be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

Band—The term "band" has the full breadth of its ordinary meaning, and at least includes a section of spectrum (e.g., radio frequency spectrum) in which channels are used or set aside for the same purpose.

Circuitry—The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some implementations, the circuitry can execute one or more software or firmware programs to provide at least some of the described functionality. The term "circuitry" can also refer to a combination of one or more hardware elements (or a combination of circuits used in an electrical or electronic system) with the program code used to carry out the functionality of that program code. In these implementations, the combination of hardware elements and program code can be referred to as a particular type of circuitry.

Processor Circuitry—The term "processor circuitry" as used herein refers to, is part of, or includes circuitry capable of sequentially and automatically carrying out a sequence of arithmetic or logical operations, or recording, storing, and/or transferring digital data. The term "processor circuitry" can refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" can be considered synonymous to, and can be referred to as, "processor circuitry."

Interface Circuitry—The term "interface circuitry" as used herein refers to, is part of, or includes circuitry that enables the exchange of information between two or more components or devices. The term "interface circuitry" can refer to one or more hardware interfaces, for example, buses, I/O interfaces, peripheral component interfaces, network interface cards, and/or the like.

Network Element—The term "network element" as used herein refers to physical or virtualized equipment and/or infrastructure used to provide wired or wireless communication network services. The term "network element" can be considered synonymous to and/or referred to as a networked computer, networking hardware, network equipment, network node, router, switch, hub, bridge, radio network controller, RAN device, RAN node, gateway, server, virtualized VNF, NFVI, and/or the like.

Appliance—The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

Resource—The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" can refer to compute, storage, and/or network resources provided by physical hardware element(s). A "virtualized resource" can refer to compute, storage, and/or network resources provided by virtualization infrastructure to an application, device, system, etc. The term "network resource" or "communication resource" can refer to resources that are accessible by computer devices/systems via a communications network. The term "system resources" can refer to any kind of shared entities to provide services, and can include computing and/or network resources. System resources can be considered as a set of coherent functions, network data objects or services, accessible through a server where such system resources reside on a single host or multiple hosts and are clearly identifiable.

Instantiate—The terms "instantiate," "instantiation," and the like as used herein refers to the creation of an instance. An "instance" also refers to a concrete occurrence of an object, which can occur, for example, during execution of program code.

Coupled—The terms "coupled," "communicatively coupled," along with derivatives thereof are used herein. The term "coupled" can mean two or more elements are in direct physical or electrical contact with one another, can mean that two or more elements indirectly contact each other but still cooperate or interact with each other, and/or can mean that one or more other elements are coupled or connected between the elements that are said to be coupled with each other. The term "directly coupled" can mean that two or more elements are in direct contact with one another. The term "communicatively coupled" can mean that two or more elements can be in contact with one another by a means of communication including through a wire or other interconnect connection, through a wireless communication channel or ink, and/or the like.

Information Element—The term "information element" refers to a structural element containing one or more fields. The term "field" refers to individual contents of an information element, or a data element that contains content.

SMTC—The term "SMTC" refers to an SSB-based measurement timing configuration configured by SSB-MeasurementTimingConfiguration.

SSB—The term "SSB" refers to an SS/PBCH block.

Primary Cell—The term "a "Primary Cell" refers to the MCG cell, operating on the primary frequency, in which the UE either performs the initial connection establishment procedure or initiates the connection re-establishment procedure.

Primary SCG Cell—The term "Primary SCG Cell" refers to the SCG cell in which the UE performs random access when performing the Reconfiguration with Sync procedure for DC operation.

Secondary Cell—The term "Secondary Cell" refers to a cell providing additional radio resources on top of a Special Cell for a UE configured with CA.

Secondary Cell Group—The term "Secondary Cell Group" refers to the subset of serving cells including the PSCell and zero or more secondary cells for a UE configured with DC.

Serving Cell—The term "Serving Cell" refers to the primary cell for a UE in RRC_CONNECTED not configured with CA/DC there is only one serving cell including of the primary cell. The term "serving cell" or "serving cells" can further refer to the set of cells including the Special Cell(s) and all secondary cells for a UE in RRC_CONNECTED configured with CA.

Special Cell—The term "Special Cell" refers to the PCell of the MCG or the PSCell of the SCG for DC operation; otherwise, the term "Special Cell" refers to the Pcell.

Automatically—Refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure can be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form can be automatically filled out by the computer system where the computer system (e.g., software executing on the computer system) analyzes the fields of the form and fills in the form without any user input specifying the answers to the fields. As indicated above, the user can invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—Refers to a value that is almost correct or exact. For example, approximately can refer to a value that is within 1 to 10 percent of the exact (or desired) value. It should be noted, however, that the actual threshold value (or tolerance) can be application dependent. For example, in some implementations, "approximately" can mean within 0.1% of some specified or desired value, while in various other implementations, the threshold can be, for example, 2%, 3%, 5%, and so forth, as desired or as required by the particular application.

Concurrent—Refers to parallel execution or performance, where tasks, processes, or programs are performed in an at least partially overlapping manner. For example, concurrency can be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components can be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors can be configured to electrically connect a module to another module, even when the two modules are not connected). In some contexts, "configured to" can be a broad recitation of structure generally meaning "having circuitry that" performs the task or tasks during operation. As such, the component can be configured to perform the task even when the component is not currently on. In general, the circuitry that forms the structure corresponding to "configured to" can include hardware circuits.

Various components can be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to reduce risks of unintentional or unauthorized access or use, and the nature of authorized use should be clearly indicated to users.

In the foregoing description, implementations of the invention have been described with reference to numerous specific details that can vary from implementation to implementation. The description and drawings are, accordingly, to be regarded in an illustrative rather than a restrictive sense. Any definitions expressly set forth herein for terms contained in such claims shall govern the meaning of such terms as used in the claims.

What is claimed is:

1. A processor for a base station, the processor including:
protocol processing circuitry configured to:
generate a radio resource control (RRC) message comprising an RRC information element indicating (i) a number of reference signals for unicast sidelink (SL) radio link monitoring (RLM) and (ii) parameters for use with the indicated reference signals for unicast SL RLM, the parameters corresponding to in-sync/out-of-sync (IS/OOS) switching;
encode the RRC message for transmission to a user equipment (UE);
generate a reference signal of the indicated number of reference signals for use as an RLM resource, wherein the reference signal indicates a subset of the parameters selectable to determine a threshold for the (IS/OOS) switching;
encode the reference signal for transmission to the UE; and
provide, to a radio frequency circuitry coupled to the processor, the RRC message and the reference signal for transmission to the UE.

2. The processor of claim 1, wherein the RRC information element further indicates a type of the RLM resource.

3. The processor of claim 1, wherein the RRC information element further indicates a timer and a constant for at least one of a radio link failure (RLF) detection procedure or a unicast SL connection procedure.

4. The processor of claim 1, wherein the reference signal is a channel state information-reference signal (CSI-RS) or a demodulation reference signal (DMRS).

5. The processor of claim 1, wherein the reference signal further indicates a number of consecutive reception events for an IS determination.

6. The processor of claim 1, wherein the reference signal further indicates a number of consecutive erroneous reception events required for an OOS determination.

7. A non-transitory computer-readable storage medium storing computer instructions, which when executed by a processor for a base station, cause the processor to:
generate a radio resource control (RRC) message comprising an RRC information element indicating (i) a number of reference signals for unicast sidelink (SL) radio link monitoring (RLM) and (ii) parameters for use with the indicated reference signals for unicast SL RLM, the parameters corresponding to in-sync/out-of-sync (IS/OOS) switching;
encode the RRC message for transmission to a user equipment (UE);
generate a reference signal of the indicated number of reference signals for use as an RLM resource, wherein the reference signal indicates a subset of the parameters selectable to determine a threshold for the (IS/OOS) switching;
encode the reference signal for transmission to the UE; and
transmit the RRC message and the reference signal to the UE.

8. The non-transitory computer-readable storage medium of claim 7, wherein the RRC information element further indicates a type of the RLM resource.

9. The non-transitory computer-readable storage medium of claim 7, wherein the RRC information element further indicates a timer and a constant for at least one of a radio link failure (RLF) detection procedure or a unicast SL connection procedure.

10. The non-transitory computer-readable storage medium of claim 7, wherein the reference signal is a channel state information-reference signal (CSI-RS) or a demodulation reference signal (DMRS).

11. The non-transitory computer-readable storage medium of claim 9, wherein the reference signal further indicates a number of consecutive reception events for an IS determination.

12. The non-transitory computer-readable storage medium of claim 9, wherein the reference signal further indicates a number of consecutive erroneous reception events required for an OOS determination.

13. A method including:
generating, by a processor for a base station, a radio resource control (RRC) message comprising an RRC information element indicating (i) a number of reference signals for unicast sidelink (SL) radio link monitoring (RLM) and (ii) parameters for use with the indicated reference signals for unicast SL RLM, the parameters corresponding to in-sync/out-of-sync (IS/OOS) switching;
encoding, by the processor, the RRC message for transmission to a user equipment (UE);
generating, by the processor, a reference signal of the indicated number of reference signals for use as an RLM resource, wherein the reference signal indicates a subset of the parameters selectable to determine a threshold for the (IS/OOS) switching;
encoding, by the processor, the reference signal for transmission to the UE; and
transmitting, by the processor, the RRC message and the reference signal to the UE.

14. The method of claim 13, wherein the RRC information element further indicates a type of the RLM resource.

15. The method of claim 13, wherein the RRC information element further indicates a timer and a constant for at least one of a radio link failure (RLF) detection procedure or a unicast SL connection procedure.

16. The method of claim 13, wherein the reference signal is a channel state information-reference signal (CSI-RS) or a demodulation reference signal (DMRS).

17. The method of claim 13, wherein the reference signal further indicates a number of consecutive reception events for an IS determination.

18. The method of claim 13, wherein the reference signal further indicates a number of consecutive erroneous reception events required for an OOS determination.

* * * * *